INVENTORS
ARMINDO CANTARUTTI &
EDWIN E. MALLORY
BY
Oberlin, Maky & Donnelly
ATTORNEYS Jan. 18, 1966  E. E. MALLORY ETAL  3,230,132
TIRE BUILDING APPARATUS
Filed Dec. 27, 1961  10 Sheets-Sheet 2

INVENTORS
ARMINDO CANTARUTTI
& EDWIN E. MALLORY
BY
Oberlin, Maky & Donnelly
ATTORNEYS Jan. 18, 1966   E. E. MALLORY ETAL   3,230,132
TIRE BUILDING APPARATUS
Filed Dec. 27, 1961   10 Sheets-Sheet 3

INVENTORS
ARMINDO CANTARUTTI &
EDWIN E. MALLORY
BY
Oberlin, Maky & Donnelly
ATTORNEYS Jan. 18, 1966     E. E. MALLORY ETAL     3,230,132
TIRE BUILDING APPARATUS
Filed Dec. 27, 1961     10 Sheets-Sheet 4

INVENTORS
ARMINDO CANTARUTTI &
EDWIN E. MALLORY
Oberlin, Maky & Donnelly
ATTORNEYS

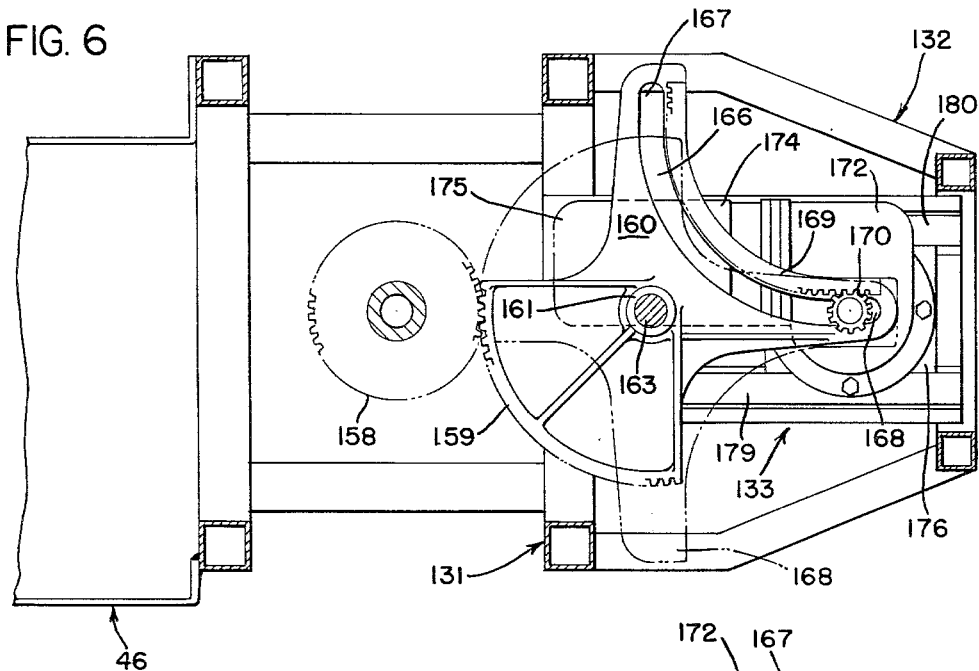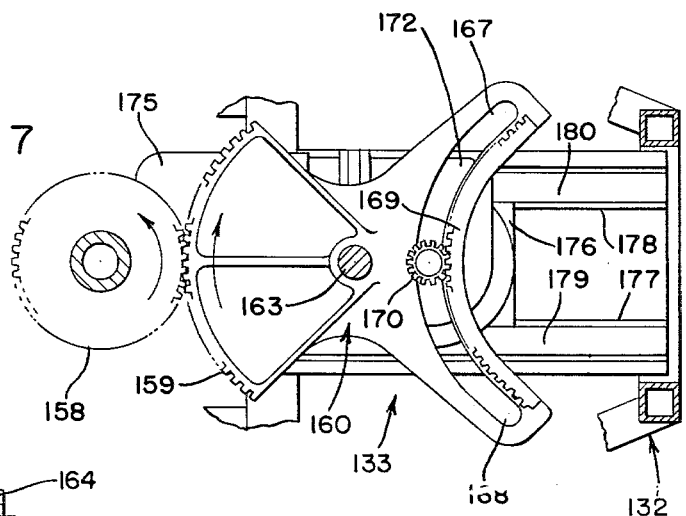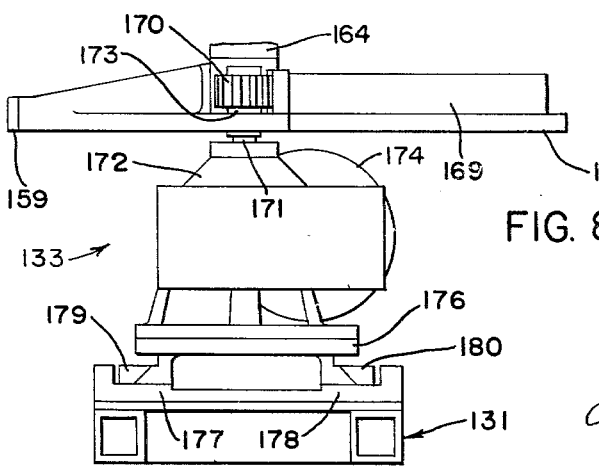

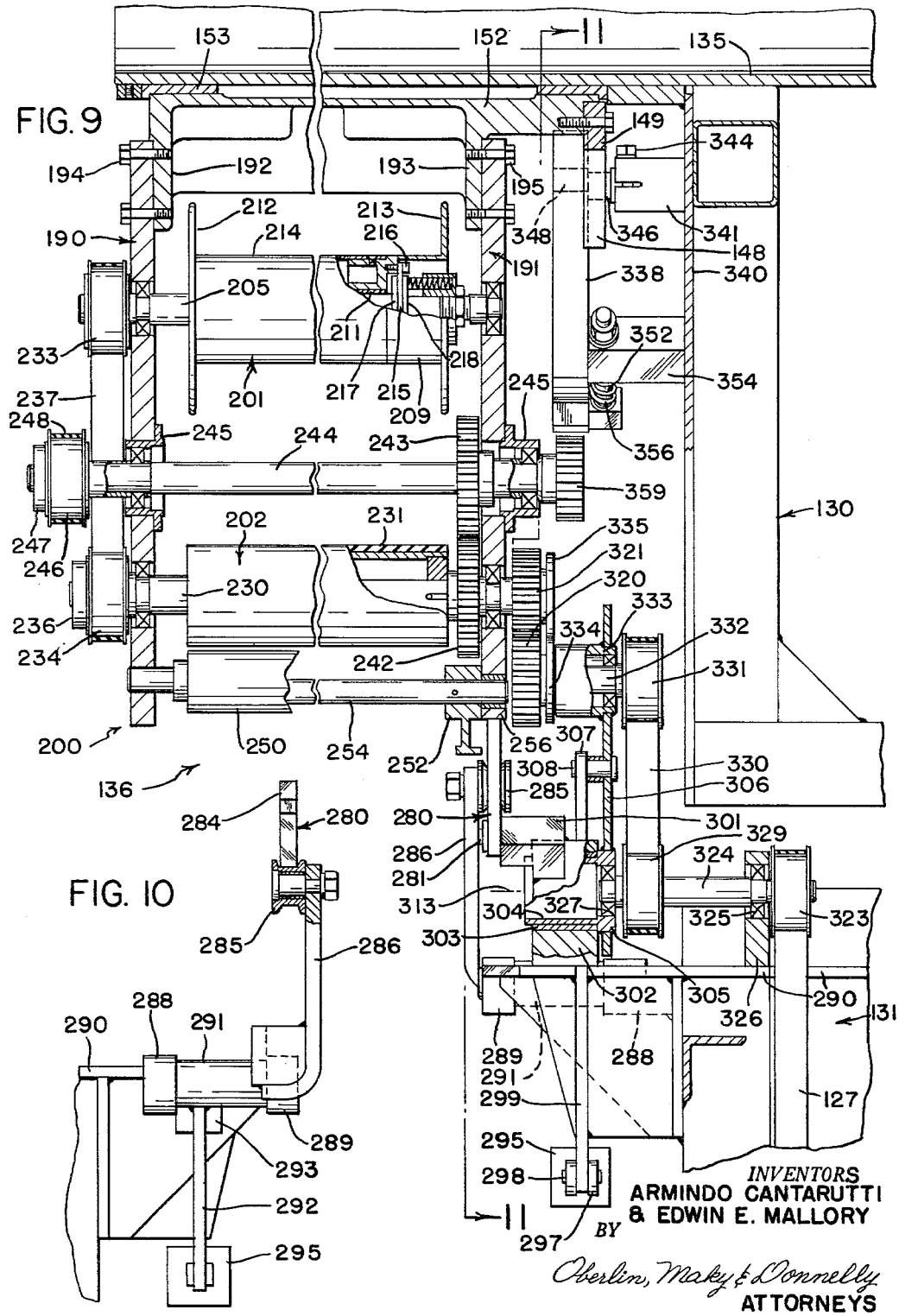

Jan. 18, 1966  E. E. MALLORY ETAL  3,230,132
TIRE BUILDING APPARATUS
Filed Dec. 27, 1961  10 Sheets-Sheet 7

INVENTORS
ARMINDO CANTARUTTI &
EDWIN E. MALLORY
BY
Oberlin, Maky & Donnelly
ATTORNEYS

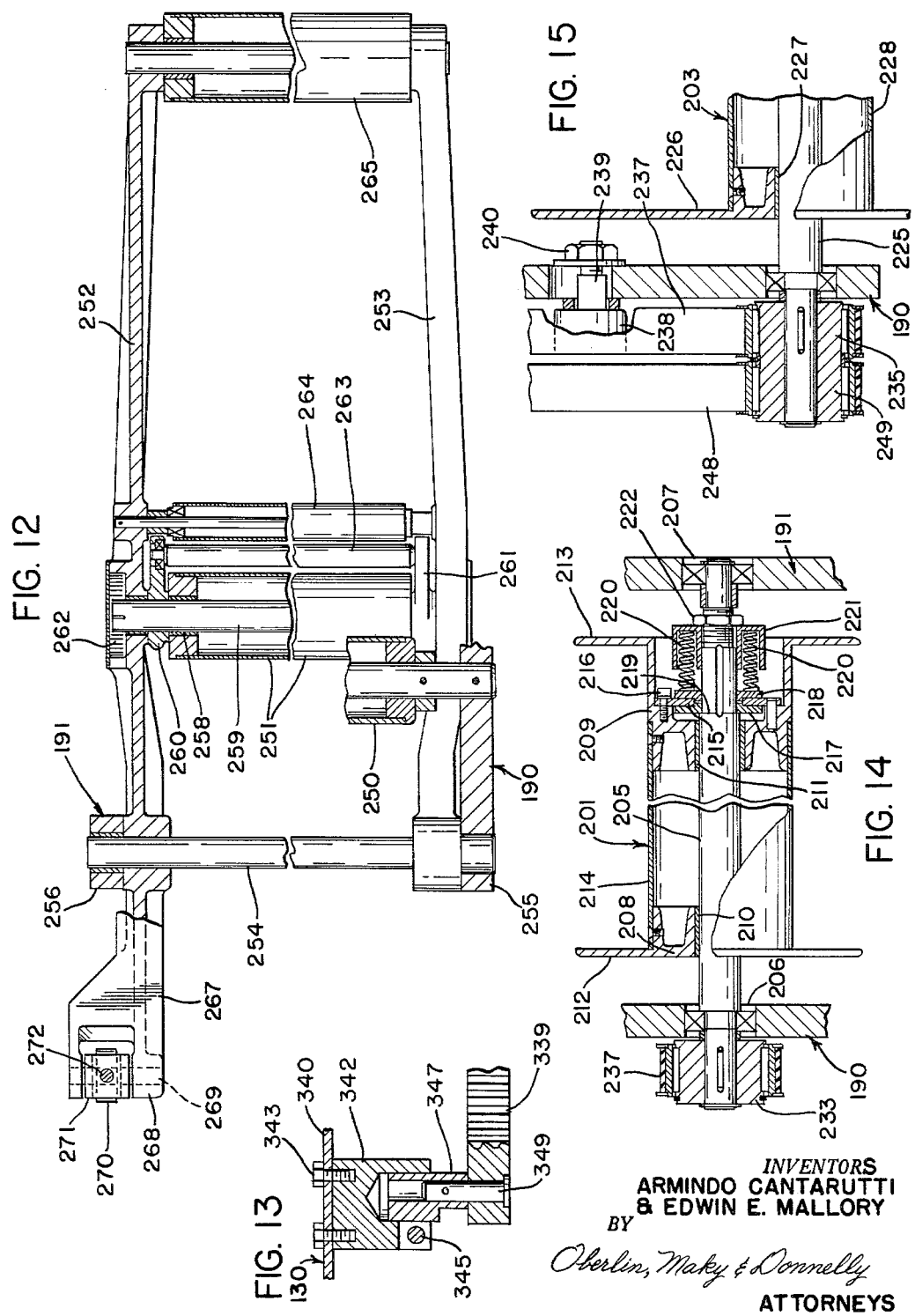

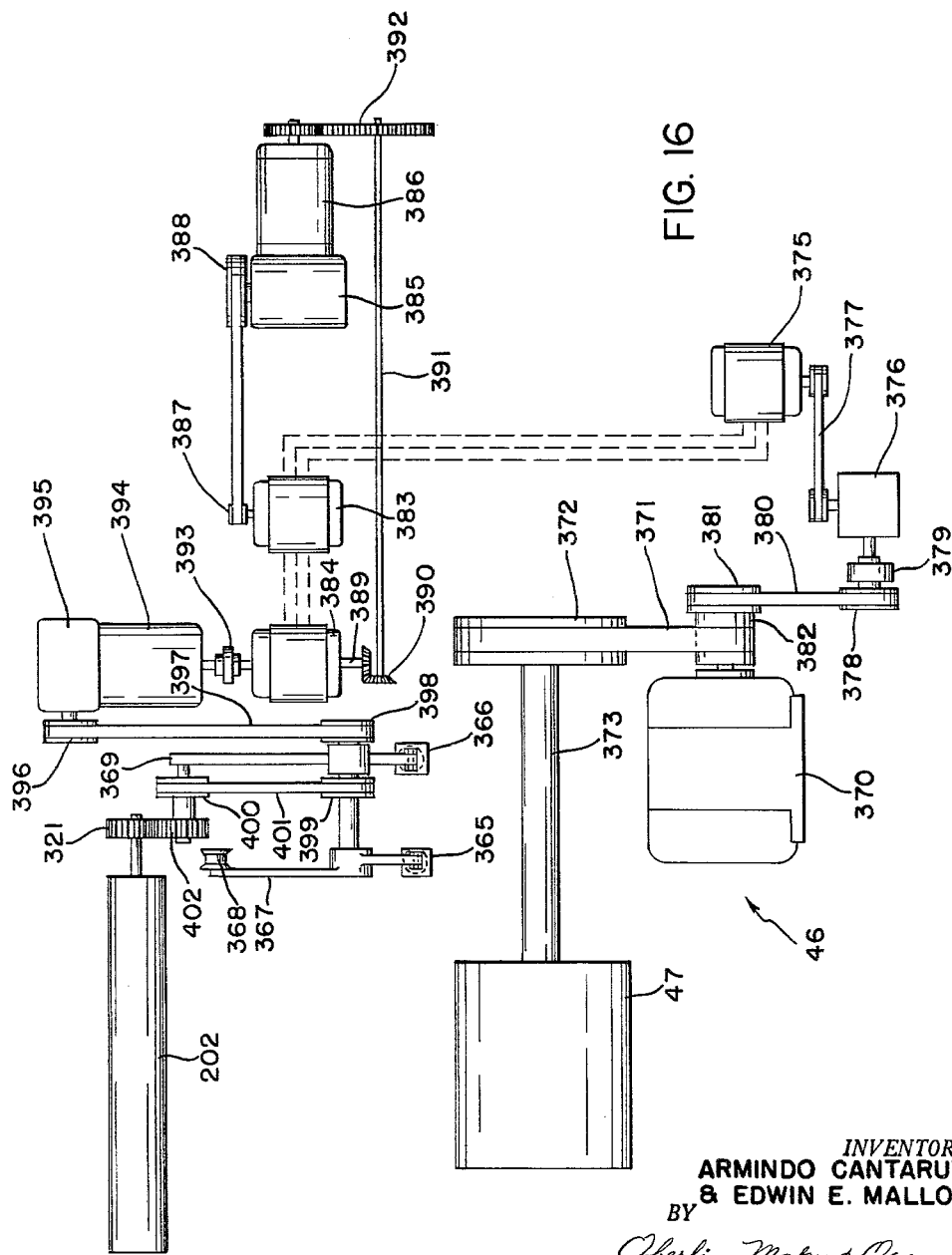

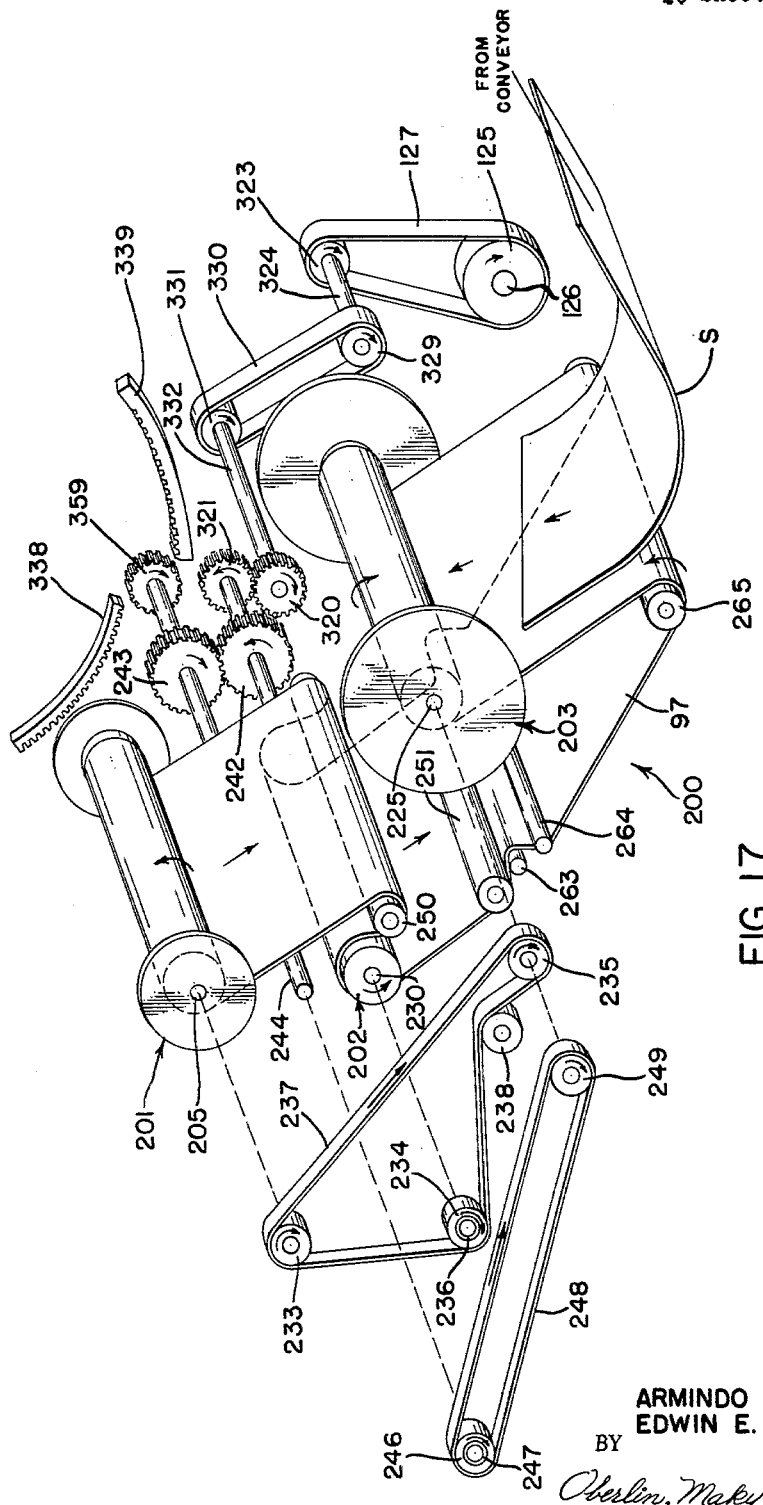

United States Patent Office 3,230,132
Patented Jan. 18, 1966

3,230,132
TIRE BUILDING APPARATUS
Edwin E. Mallory and Armindo Cantarutti, Cuyahoga Falls, Ohio, assignors to NRM Corporation, a corporation of Ohio
Filed Dec. 2, 1961, Ser. No. 162,762
45 Claims. (Cl. 156—406)

This invention relates generally, as indicated, to tire building apparatus and more particularly to tire building apparatus adapted to sort and store a plurality of strips of tire building materials in proximity to a drum type tire building machine to facilitate and increase the production of tires thereon and to increase the uniformity of tires thus produced.

In the production of green tire bands or tire carcasses on drum type tire building machines, a plurality of strips of tire building material must be wrapped upon the drum as it is being rotated. For example, the liner is first applied to the drum, plies of tire fabric with reinforcing cords therein are then wrapped about the liner, the successive plies having the cords therein biased in opposite directions, bead rings, chafer and breaker strips are added and finally the tread block or slab is wrapped about the drum to produce a finished tire carcass. The carcass is then removed from the drum to be placed in a tire curing press for shaping and curing. The various strips of tire building materials must be wrapped upon the drum and preceding materials at zero tension to avoid stretching of such materials and yet also avoid buckling or high spots which also produce weak spots. It is, of course, an arduous and difficult task to produce tire carcasses on such drum type machine in a rapid manner and yet still produce tire carcasses of uniform quality.

Heretofore, massive servicing machines have been employed to store and make available various tire building materials to the drum of the tire building machine but these servicers have not been capable of being quickly and conveniently loaded nor able to dispense the desired material at the desired time in the cycle of the drum type tire building machine to enable high speed production. Moreover, the material had to be manually payed from such servicers and difficulty in smoothly and uniformly applying the tire building materials to the drum has been encountered.

Since the layers of tire building materials are generally wrapped only once about the drum, it becomes necessary to present a different storage facility to the tire building machine many times during the cycle thereof. Accordingly, a servicer which will quickly and conveniently place different tire fabric material storage drums in position automatically to pay onto the building drum the various tire building materials required will enhance and make more efficient the production of such tire building machine. Moreover, a servicer which will dispense the tire building materials in the proper position at a speed synchronized with the drum of the tire building machine will also increase not only the speed of production, but the uniformity of quality of the tire carcasses thus produced.

It is accordingly a principal object of the present invention to provide a tire building material servicer for a drum type tire building machine which will quickly and conveniently present for dispensation drums or rolls of various types of tire building materials to the drum of such tire building machine.

It is another important object to provide a servicer for drum type tire building machines which can readily be synchronized with the drum so that the material in question can be smoothly and uniformly distributed on the drum of the tire building machine.

When tire fabric having reinforcing cords therein is wound on a tire storage drum or roll in such servicer, it is required to separate the adjacent convolutions of such fabric with a liner or the like to prevent adjacent convolutions sticking together due to the tacky nature of the material being handled. Since the tire fabric is relatively flimsy and quite sticky, it is difficult to handle. Accordingly, with the present invention, the tire fabric is stored only in contiguous relationship to the liner and contact with other elements from the time the fabric is placed in the servicer until it is withdrawn for application to the tire building drum is avoided.

It is then another important object of the present invention to provide a tire servicer for storing and handling cord reinforced tire fabrics without wrapping or pulling such fabric about rolls and which can apply such fabric to the drum of the tire building machine directly from the liner.

Similarly, it is another important object to provide a servicer for such fabric wherein it may be loaded into the servicer directly onto the liner.

It is a further object to provide a servicer for tire building machines having oppositely extending ferris wheels which can be shifted quickly and easily to loading and unloading positions.

Still another object is the provision of a rotating ferris wheel for such servicer which can quickly and easily locate a selected storage drum in position to dispense the tire fabric wrapped therearound on the drum of the tire building machine.

Yet another object is the provision of such servicer having a unique liner for the tire fabric and drive system therefor.

It is yet another object to provide a servicer having a liner which forms an apron automatically to receive and discharge the tire fabric.

Yet a further object is the provision of such servicer wherein the liner will be driven both for loading and unloading the tire fabric in synchronization to preclude buckling or stretching of the tire fabric.

A yet further object is the provision of tire building apparatus which will permit the faster and more economical use of drum type tire building machines and which will enable the tires produced thereon to be more uniform in quality.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 6 is a horizontal fragmentary section of the swing drive for such servicer taken substantially on the line 6—6 of FIG. 5;

FIG. 7 is a view similar to FIG. 6 illustrating the servicer drive in an intermediate position;

FIG. 8 is a detail view of such drive taken substantially on the line 8—8 of FIG. 5;

FIG. 9 is an enlarged fragmentary vertical section taken substantially on the line 9—9 of FIG. 5 illustrating the liner drive mechanism of the present invention;

FIG. 10 is an enlarged fragmentary vertical section taken from the opposite direction substantially on the line 10—10 of FIG. 11;

FIG. 12 is a fragmentary enlarged detail sectional view of the apron-forming liner frame taken substantially on the line 12—12 of FIG. 5;

FIG. 13 is an enlarged fragmentary horizontal detail section taken substantially on the line 13—13 of FIG. 11;

FIG. 14 is an enlarged fragmentary vertical section of the liner roll;

FIG. 15 is an enlarged fragmentary detail section taken substantially on the line 15—15 of FIG. 5 showing the stock roll and drive therefor;

FIG. 16 is a diagrammatic illustration of the drive for the liner on the unload side of the servicer and the synchronizing means therefor ensuring the liner and tire building drum will be driven at synchronized speed; and FIG. 17 is a diagrammatic isometric partially exploded view of the liner, its disposition in the servicer, and the drive therefor.

General arrangement

Figure 1:
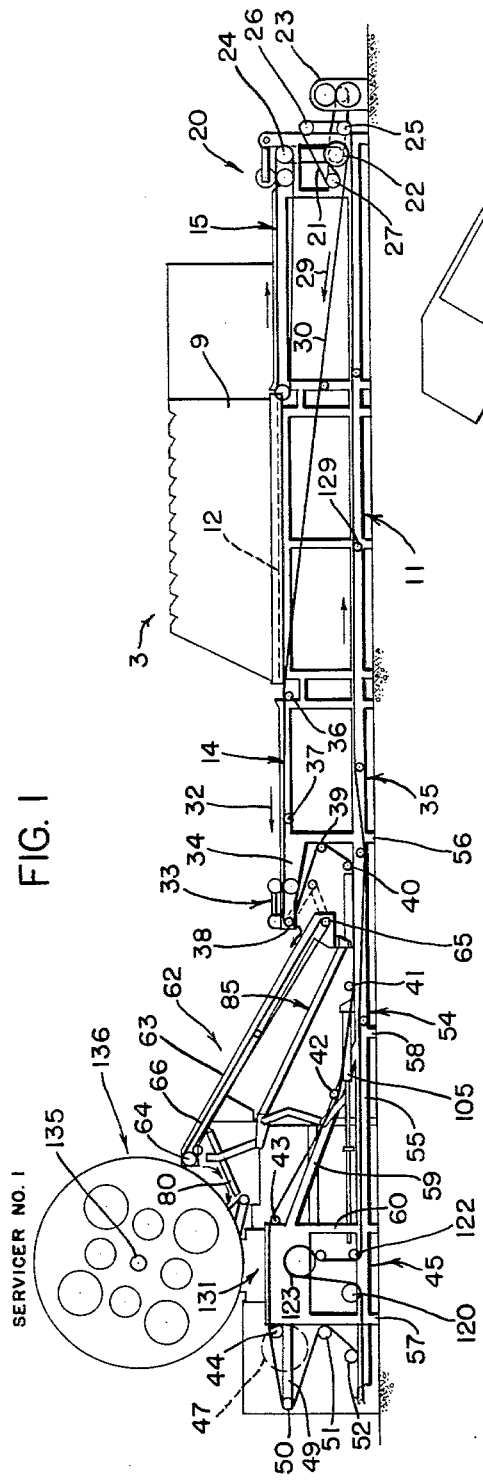
FIG. 1 is a schematic fragmentary side elevation of tire building apparatus in accordance with the present invention.
Figure 2:
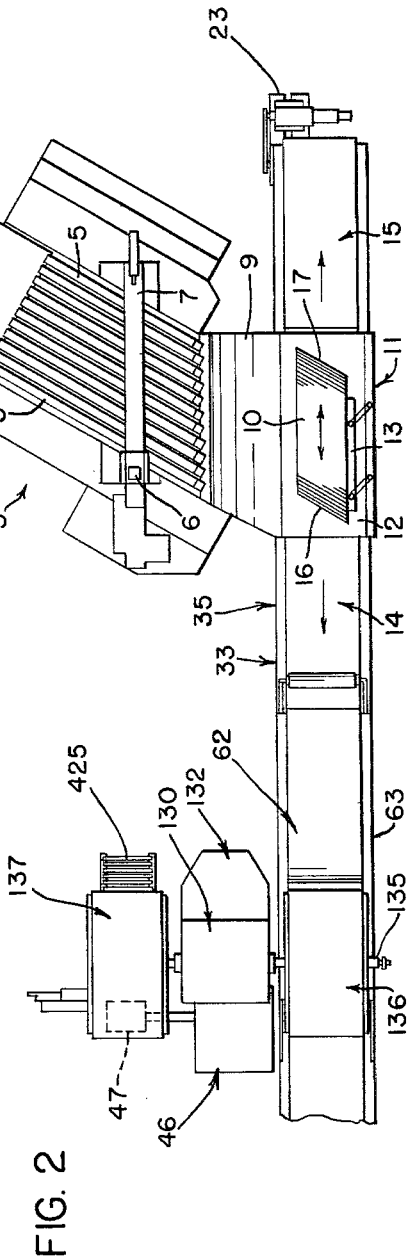
FIG. 2 is a fragmentary top plan view of the apparatus in FIG. 1.

Referring now to the annexed drawings and more particularly to FIGS. 1 and 2 it will be seen that large reels of tire fabric may be placed on stand 2 to be uncoiled onto a high table bias cutter shown generally at 3. The tire fabric has reinforcing cords therein which extend longitudinally of the strip as indicated by the arrow 4. Such strip passes onto a plurality of progressively increasing length conveying belts 5 which convey the material beneath a reciprocating cutter 6 mounted on an adjustable track 7. The track 7 may be adjusted longitudinally of the strip being severed to control the width of the severed sections and also the angle of the cut with respect to the strip may be readily controlled. The severed sections are deposited on an inclined sloping surface 9 which causes the severed sections 10 to fall to a feed table 11. The surface 9, which constitutes a continuation of the table top 12, receives the section which abuts against an adjustable stop 13 which aligns the section with the center of feed conveyor belts 14 and 15 moving substantially in the horizontal plane of the table top 12, but in opposite directions away therefrom. It can now be seen that a continuous strip of tire fabric having the cords therein extending longitudinally has been severed into a rhomboid-like section. An operator may be placed at the table 11 to join such sections in a continuous strip along the end edges thereof shown at 16 and 17 simply by lapping such sections together or an automatic butt joining machine may be employed. The continuous strips thus formed, having the cords therein biased, may be then fed onto the conveyor belt 14 or the conveyor belt 15.

Strips of tire fabric fed onto the conveyor belt 15 will pass beneath a pressing roll assembly shown generally at 20 in FIG. 1 and drop onto an inclined portion 21 of the conveyor belt 14. The conveyor belt 14 passes about a drive roll 22 which is driven by a motor 23 and a chain drive or the like may be employed to drive the drive roll 24 of the belt 15 at the same speed. The belt 14 at its driven end is trained about idlers 25, 26 and 27 in addition to the drive roll 22, the idler rolls 26 and 27 forming the downwardly inclined flight of the belt 14 which receives the strips of tire fabric from the belt 15. Since the belt 14 will be driven in the direction of the arrow 29, strips of tire fabric material dropping from the belt 15 will be flipped over to move up the inclined path 30 of such belt with the cords thereof biased in the opposite direction than if such strips were fed directly onto the belt 14 from the table top 12. The thus inverted strips of tire fabric material are fed up beneath the surface 12 of the table 10 onto the top horizontal flight adjacent such surface.

The strips of tire fabric, whether fed directly onto the belt 14 or onto such belt by means of the belt 15 and thus inverted, pass horizontally away from the table top 12 in the direction of the arrow 32 beneath a pressing roll assembly 33 which serves the same function as the pressing roll assembly 20. The pressing roll assembly 33 is mounted on a cantilevered portion 34 of conveyor stand 35 which forms the top horizontal flight for the belt 14 substantially coplanar with the table top 12. The belt passes over idler rolls 36, 37 and 38 with the latter being mounted at the distal end of the cantilevered portion 34. The belt 14 which is trained about a good portion of the periphery of the roll 38 then passes about idler rolls 39 and 40 and extends beneath idler rolls 41, 42 and above idler rolls 43 and 44 mounted on the conveyor stand 45 adjacent servicer No. 1 which is positioned adjacent tire building machine No. 1 shown at 46. This tire building machine includes a drum 47 on which the tire carcass is constructed.

The stand 45 is provided with a cantilevered portion 49 which mounts on the distal end thereof an idler roll about which the belt is trained then to pass about idlers 51 and 52, the idlers 50, 51 and 52 corresponding in position to the idlers 38, 39 and 40. The idler rolls 40 and 41 are mounted on a conveyor stand 54 which joins the conveyor stands 35 and 45. The stand 54 is comprised mainly of a horizontal support member 55 which joins the legs 56 of the stand 35 and the leg 57 of the stand 45. An intermediate support leg 58 and an upwardly inclined support member 59 extending from the leg 58 to the legs 60 of the stand 45 serve to support the various belt rollers which deflect or by-pass the belt 14 about a loading and centering conveyor indicated at 62. The loading and centering conveyor 62 includes a frame 63 having belt rolls 64 and 65 journalled in the distal and proximal ends thereof respectively about which belt 66 is trained. Idler rolls 67 and 68 are also journalled in the frame 63 to guide and support the belt 66, the roll 67 serving to initiate the return flight of the belt beneath the frame 63. A roller 69 mounted on arms 70 pivoted at 71 may be brought to bear against the belt on its return flight at an adjustable pressure determined by the position of the arms 70 with respect to adjusting screws 72. The roll 65 is driven from the roll 38 by chain drives 74 and 75 articulated at 76; the size of the drive sprockets in such articulated drive linkage being identical throughout, the rolls 38 and 65 will thus move at the same speed. A discharge pan 80 is pivotally mounted at the distal end of the conveyor 62 on brackets 81 and springs 82 coiled about guide rods 83 maintain resiliently the pan in its extended full line position indicated in FIG. 3.

The conveyor 62 is mounted on a sub-frame 85 for slight pivotal movement about the vertically extending axis of pivot pin 86. The sub-frame 85 includes upper laterally spaced platforms 87 on which rollers 88 ride. These rollers are mounted on downwardly projecting legs reinforced by gusset plates 90 or the like depending from the frame 63 of the conveyor 62. The lower end of the sub-frame 85 is provided with a support platform 91 which supports rollers 92 mounted on the frame 93 at the proximal end of the conveyor 62.

An edge position responsive control 95 operated by a sensitive edge detector 96 is effective to operate a piston-cylinder assembly to pivot the conveyor 62 about the pin 86 so that the tire fabric strip discharged therefrom dropping onto the pan 80 and then onto the extended liner 97 will be properly centered with respect to the conveyor line and thus the liner and storage drum. The edge position responsive control mechanism 95 is mounted on a stanchion 98 of the sub-frame 85.

The sub-frame 85 is mounted for raising and lowering movement on a pair of arms 100 and 101 which are fixed for pivotal movement to shaft 102 which also has a crank arm 103 secured thereto. This arm is pivoted to the rod 104 of piston-cylinder assembly 105, the blind end of which is pivoted at 106 to a bracket mounted on the horizontal frame member 55. The rod extends through a guide bracket 107 and a compression spring 108 extends about such rod between such bracket and a fixed collar 109. It can thus be seen that as the piston-cylinder assembly 105 extends, it will move the crank arm to the phantom line position shown at 110 pivoting the arms 100 and 101 to the phantom line position shown at 111.

The lower or proximal end of the sub-frame 85 is provided with rollers 112 riding in rails 113 on the horizontal frame members 55 so that as the arms 100 and 101 pivot about the axis of shaft 102, the sub-frame will slide backwardly beneath the cantilevered portion 34, the articulated chain drive moving to the position indicated in phantom lines at 114 yet still being effective to drive the belt 66 at the same speed as belt 14. The conveyor 62 supported on the sub-frame then moves downwardly to the phantom line position shown at 115 and the pan 80 moves to the phantom line position shown at 116. When the loading and centering conveyor 62 has thus been lowered by extension of the piston-cylinder assembly 105, tire fabric will then pass from the cantilevered portion 34 onto the belt 66 and then back onto the belt 14 as indicated by the arrow 117. The lower or by-pass position of the conveyor is quickly obtained so that the strip on the conveyor belt 14 will by-pass servicer No. 1 and move with the belt 4 over the idler rolls 43 and 44 to be cantilevered by the portion 49 over the proximal end of the next loading and centering conveyor in the conveyor line. Retraction of the piston-cylinder 105 with the assistance of a compression spring 108 will quickly and conveniently raise the loading and centering conveyors to be positioned adjacent the extended liners 97 in the respective servicers.

It can now be seen that the belt 14 will continue on to load further loading and centering conveyors which in turn will load further servicers which will in turn service further tire building machines aligned with the axes of the drums parallel alongside the path of belt 14. Eight or more such servicers and tire building machines may, for example, be loaded by the conveyor 14 depending on the labor standards of a particular plant operation.

Figure 3:
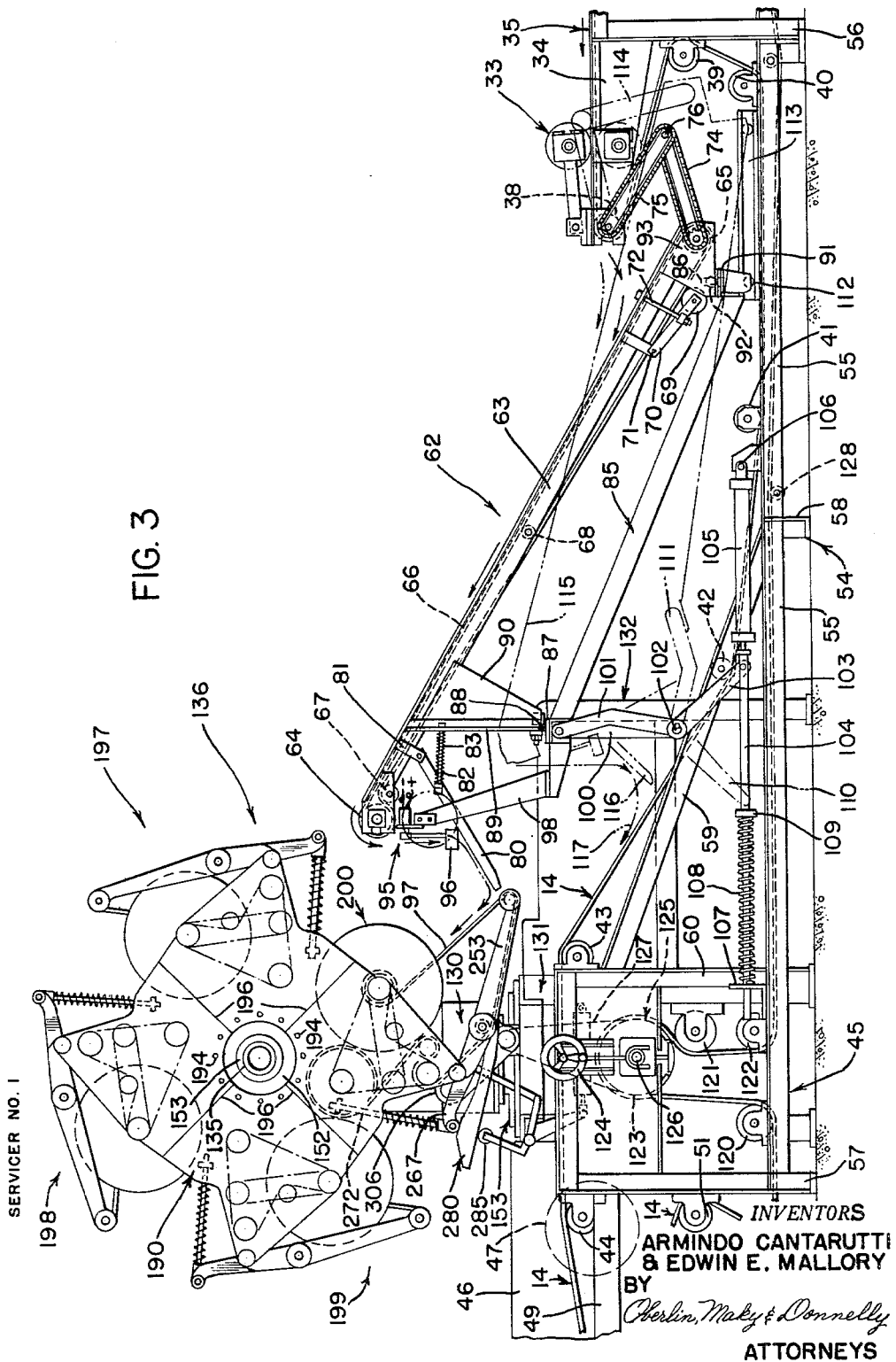
FIG. 3 is a fragmentary side elevation on a somewhat enlarged scale of a tire servicer and loading mechanism therefor in accordance with the present invention.

As seen in FIGS. 1 and 3, the return flight of the conveyor belt 14 will be generally along the horizontal frame members 55 of the successive conveyor stands and, at each stand 45 adjacent the servicer and tire building machine, the belt 14 will be deflected by idler rolls 120, 121 and 122 about the periphery of an adjustable diameter pulley 123, such diameter being adjusted by a hand wheel operated shaft adjustment mechanism shown generally at 124. A cog belt pulley 125 on the shaft 126 of the pulley 123 drives a cog belt 127 to synchronize the drive of the liner 97 with the speed of the belt 14 as will hereinafter be described. The belt 14 continues its return flight supported on idler 128 continuing beneath the table 11 supported on idlers 129 to be trained about the idler 25, the idlers 26 and 27, and finally about the drive roll 22 driven by the drive unit 23. Reference may be had to our copending application entitled "Tire Building Apparatus," filed December 27, 1961, Serial No. 162,720 for a more complete disclosure of a conveyor system that may be employed with the present invention.

*The servicer*

Referring now to FIGS. 1 through 8, it will be seen that the illustrated servicer comprises an upstanding turret columnar frame 130 mounted for rotation about a vertically extending axis in a base 131, such base including a drive housing 132 for a drive mechanism indicated generally at 133 effective to oscillate the turret about its vertically extending axis. A horizontally extending tubular shaft 135 adjacent the top of the turret frame 130 supports for intermittent rotation about the horizontal axis thus afforded, two ferris wheel units 136 and 137, each of which will be substantially identical in form and for convenience only the unit 136 will be described in detail.

Figure 4:
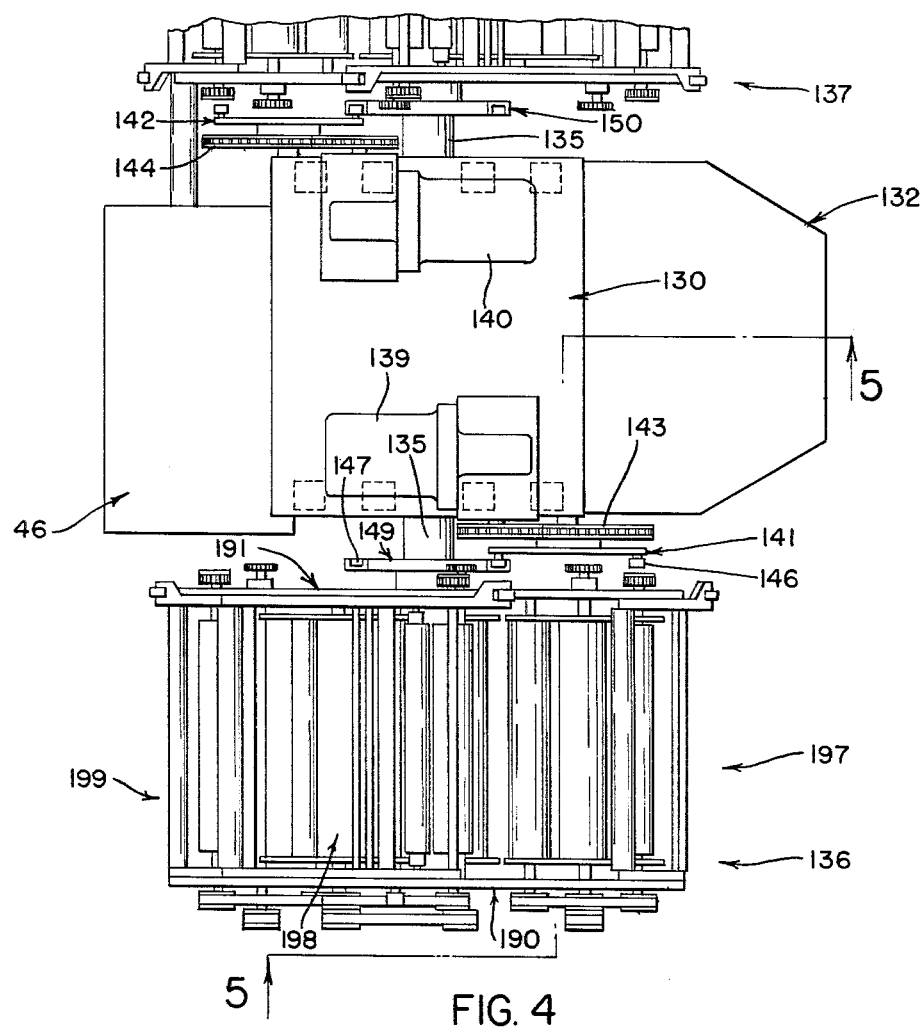
FIG. 4 is a fragmentary top plan view of the servicer of the present invention.

As seen in FIG. 4, drive motors 139 and 140 are mounted on the top of the turret frame 130. The motors 139 and 140 rotate Geneva drive mechanisms or star wheels 141 and 142 respectively through chain drives 143 and 144. Each of the Geneva drive wheels is provided with four quadrant spaced arms 145 having rollers 146 at the distal ends thereof. As seen perhaps more clearly in FIGS. 5 and 11, the rollers 146 engage in slots 147 in the four quadrant spaced driving arms 148 of the driven Geneva wheels 149 and 150 for the respective ferris wheels, which are identical in form. As seen in FIG. 9, the star-shaped driven Geneva wheels are bolted to the hubs of the respective ferris wheels, indicated in FIG. 9 at 152, which are mounted for rotation on sleeves or bushings 153. In this manner, the motor drives 139 and 140 will cause the Geneva drive wheels 141 and 142 to rotate through 90° thus rotating the Geneva driven wheels 149 and 150 to rotate or index the ferris wheels 136 and 137 through 90°. It is noted that with the Geneva mechanism shown, the rotation of the ferris wheels through the 90° index will reach a maximum velocity at the end of 45° of rotation and the ferris wheels will initially accelerate and then decelerate after such 45° of rotation. This permits the large mass of the ferris wheels more effectively to be driven by the motors 139 and 140 more quickly to be indexed into the selected position.

Figure 5:
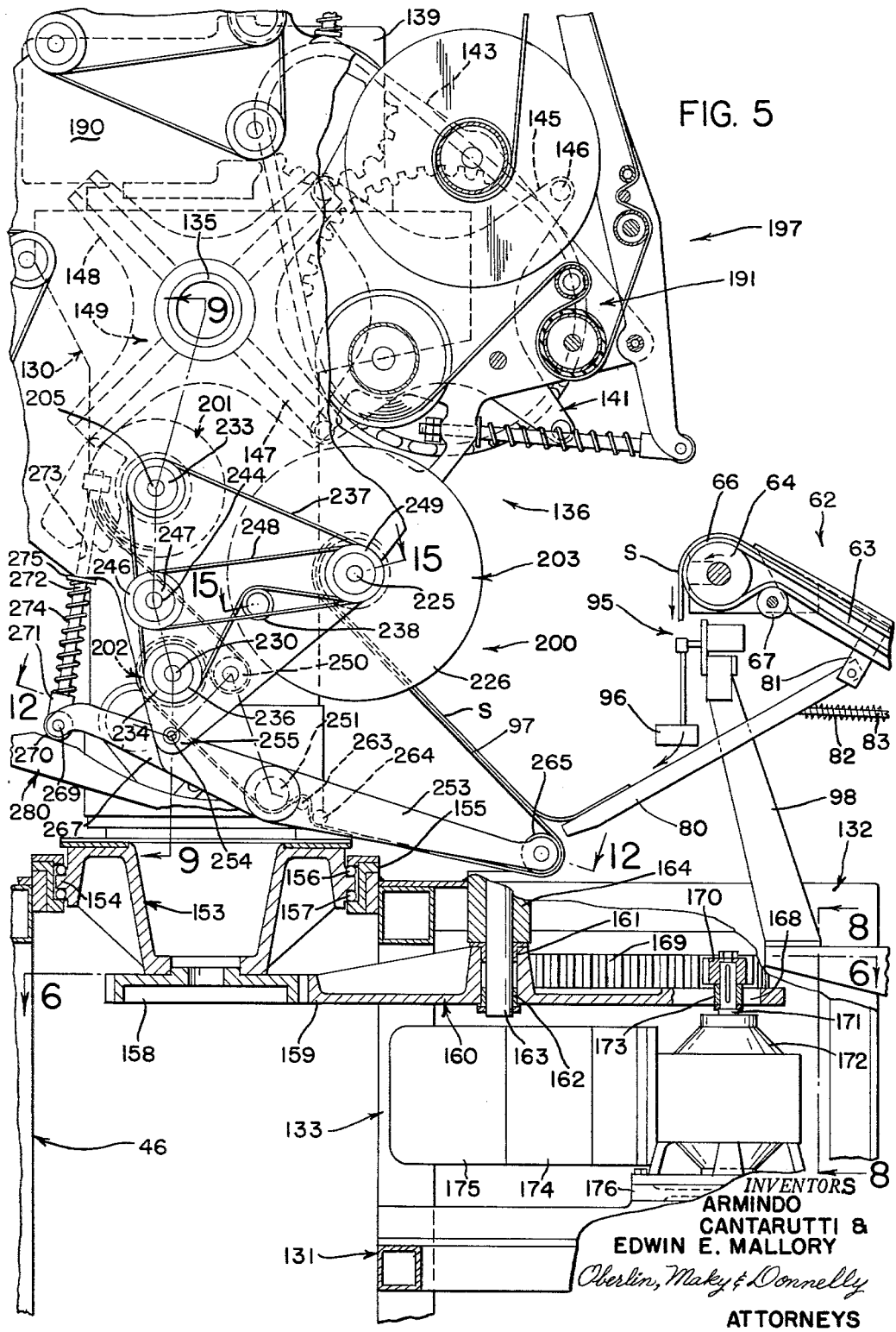
FIG. 5 is an enlarged detail fragmentary sectional view taken substantially on the line 5—5 of FIG. 4.

A similarly accelerating drive for the rotation of the servicer about its vertically extending axis is also provided as indicated in more detail in FIG. 5 through 8. The turret frame 130 includes a lower circular support frame member 153 as seen in FIG. 5 provided with an annular peripheral flange 154 which cooperates with the enclosing annular structure 155 of the base frame 131 to provide dual races for rows of ball bearings 156 and 157. Other types of bearing supports may, of course, be provided. The turret member 153 has fastened to the bottom thereof a gear 158 in mesh with a quadrant-shape gear segment 159 which forms part of an intermediate drive member 160 mounted for oscillation in bushings 161 and 162 on shaft 163 depending from boss 164 in the top of the drive housing 132. As seen in FIGS. 6 and 7, the drive member 160 includes an arcuate slot 166 symmetrical with and diametrically opposed to the circular gear segment 159. The slot 166 is provided with linear end portions indicated at 167 and 168 which may, for example, be three inches in length. Adjacent the slot, there is provided an arcuate rack 169 having corresponding linear end portions, such rack being in mesh with pinion 170. The pinion 170 is mounted on the output shaft 171 of gear reducer 172, such shaft being provided with a bushing 173 being closely confined within the slot 166. The reducer 172 is driven by a motor 174 which includes a brake unit 175. The reducer-motor-brake unit is mounted on a sliding base 176 as seen in FIG. 8 which is slide-guided on ways 177 and 178. Gibs 179 and 180 confine and assist the reducer-motor-brake unit in such horizontal sliding movement. The ways are mounted on the tubular frame portion of the base frame 131 as indicated in FIG. 8.

It can now be seen that energization of the motor will drive the pinion 170 and since the pinion is confined for movement within the slot 166, the pinion and the motor-brake unit will move toward the pivot shaft 163 on the ways 177 and 178. Continued rotation of the pinion will move to its extreme position wherein the pinion is adjacent the shaft 163 and this movement will rotate the drive member 160 through the 45° of rotation shown and continued rotation of the pinion 170 will cause the motor-brake unit to move back away from the shaft 163 to the limit of movement shown in FIG. 6, only in this instance, the pinion will be now in the linear end portion 167 of the slot 166 instead of the initial linear end portion 168. The drive member 160 will have now rotated through 90° driving the gear 158 and thus the turret columnar frame 130 supported on the turret member 153. The linear end portions 167 and 168 of the slot 166 and the coresponding linear end portions of the curved rack 169 provide dwell periods at the end of the 90° indexing movement of the turret. In this manner, rotation of the pinion causing linear movement of the motor-brake unit along the ways within the linear end portions of the guide slot 166 will not cause any rotational movement of the gear 158 or the turret. As the pinion moves around the slot, it will be understood that a maximum rotational velocity will be obtained in the FIG. 7 position and that a uniform acceleration and deceleration will be provided on either side of the FIG. 7 position. Thus initially rotation of the pinion 170 will not be effective to rotate the gear segment 159 and thus the gear 158 but as the pinion continues to rotate, the gear 158 will slowly accelerate to the maximum velocity position shown in FIG. 7 and then slowly decelerate until the dwell period of the linear portion 167 of the slot 166 is reached at which time no further rotation will occur. For example, the overtravel may be three inches and the travel of the motor during acceleration and deceleration may be 8¾ inches along the ways 177 and 178. With this drive system, it has been found that the massive turret column member 130 and the ferris wheels 136 and 137 thereon may be turned around or end-for-end in as short a period as 22 seconds.

As seen in FIG. 6, the housing portion 132 as well as the base frame 131 may be comprised of a plurality of square sectional tubular columns and beams and the housing 46 for the drive of the drum 47 may be positioned adjacent the support frame 131 as indicated. It can now be seen that the drive within housing 132 enables either the ferris wheel 136 or the ferris wheel 137 to be placed alternately adjacent the drum 47 to discharge the tire fabric stored therein or placed aligned with the belt 14 to be loaded by the loading and centering conveyor 62.

The ferris wheel

Referring now more particularly to FIGS. 3, 4, 5 and 9, it will be seen that the ferris wheel 136 is comprised of side plates 190 and 191 which are bolted or otherwise suitably secured to the respective annular flanges 192 and 193 of the hub 152 as indicated at 194 and 195 in FIG. 9. The side plates are preferably of cast aluminum and each may be composed of four quadrant-shaped sectors which may be firmly joined on the lines 196 indicated in FIG. 3 to form, for example, the side plate 190. Thus there will be four such sectors required to make a complete ring or side plate and a total of 16 for each of the servicers The laterally corresponding sectors of the side plates 190 and 191 each journal therein the various rolls which make up a single tire fabric storage unit. Accordingly, the ferris wheel 136 is comprised of four stock storage units indicated generally at 197, 198, 199 and 200. In this manner, tire fabric for a four-ply tire may be stored in such units with the cords of such fabric biased in opposite directions in alternate units. For a six-ply tire, six such units may be provided in the ferris wheel. Since all of such units are identical in form, only the unit 200 will be described in detail.

Referring now to FIGS. 5, 9 and the detailed views 14 and 15, it will be seen that the side plates 190 and 191 have journalled therein a liner roll 201, a liner drive roll 202, and a stock or combination liner-fabric storage roll 203. With reference to FIGS. 9 and 14, it will be seen that the liner roll is mounted on shaft 205 journalled in aligned openings 206 and 207 in the side plates 190 and 191 respectively. The liner drum comprises end members 208 and 209 mounted on bushings 210 and 211 respectively on the shaft 205. Such end members include outwardly extending annular flanges 212 and 213 and cylindrical member 214 bridges such end members to provide a cylindrical drum having such outwardly directed end flanges. The axial distance between the flanges may be exactly the width of the liner 97 which, in the illustrated embodiment, may be 36 inches.

An annular apertured plate 215 is secured to the interior of the end member 209 by screws or the like 216 and such plate is confined between the legs of annular L-shape plates 217 and 218. The plate 217 fits against a shoulder 219 on the shaft 205 and springs 220 held in annular spring retainer 221 may be employed resiliently to press the annular plate 218 against the annular plate 215. The pressure of the springs is controlled by nut 222 threaded on a shaft 205. The plates 217 and 218 may be keyed to rotate with the shaft whereas the drum 201 may rotate with respect to the shaft on the bushings 210 and 211. The pressure of the springs 220 thus provides a controlled slippage between the drum 201 and the shaft 205.

The stock storage roll 203 is similarly mounted on its shaft 225 and such shaft is journalled in both the plates 190 and 191. As seen in FIG. 15, the drum 203 is provided with flanged end members 226 which are mounted on bushings 227 on the shaft 225. As in the case of the liner drum, a cylindrical member 228 will join the end members to form the core of the drum. In the illustrated embodiment, the diameters of the cylindrical members 214 and 228 may be the same or, for example, 5 inches, whereas the diameter of the flanges 212 and 213 for the liner roll may be 11 inches and the diameter of the flanges 226 for the stock roll may be 19 inches. It will, of course, be understood that the liner alone will be wound on the liner roll and the liner plus the strips of tire fabric will be wound in alternate layers on the stock roll 203. The drum 203 will also have a controlled slippage clutch connection with its shaft as does the liner roll 201.

The liner drive

The liner drive roll 202 (see FIG. 17) is mounted on shaft 230 which is journalled in aligned openings in the side plates 190 and 191. The drive roll may be provided with a rubber covering as indicated at 231 in FIG. 9 and the diameter thereof may be, for example, approximately 4¾ inches as compared to the 5 inch diameter of the liner and stock rolls. The shafts 205, 230 and 225 of the liner, drive and stock rolls respectively project through the side plate 190 and have secured thereon cog belt pulleys 233, 234 and 235 respectively, with the latter being of the dual pulley type indicated in FIG. 15. The pulley 234 is secured to the shaft 230 through a conventional cam-roll overrunning clutch shown generally at 236. (See FIG. 9.) A cog belt 237 is trained about such pulleys and about an idler 238 mounted on shaft 239 secured to the side plate 190 by nut 240 or the like (see FIG. 15). Thus when the liner drive roll 202 is driven as hereinafter described to wind the liner onto the liner drum 201, the rotation of such liner drive roll will be imparted to the liner drum 201 through the belt 237 while the stock drum 203 slips on its shaft 225.

Keyed to the shaft 230 of the liner drive roll, there is provided a gear 242 in mesh with gear 243 on counter shaft 244 also journalled in the side plates 190 and 191 through annular retainers (see FIG. 9). The shaft 244 projects through the retainer 244 in plate 190 and terminates in a cog belt pulley 246 secured to the end of such shaft by means of a cam-roll overrunning clutch 247 which may be identical in form to the clutch 236. A cog belt 248 is trained about the pulley 246 and the outside portion 249 of the dual pulley 235. When the liner is being driven from the stock drum 203 to the liner drum 201, the drive roll 202 will be driven in a clockwise direction as viewed in FIG. 5 and in this direction, the clutch 236 will be engaged to drive the belt 237 also to drive the stock and liner drums in such clockwise direction. Due to the slightly larger diameter of the liner roll the liner 97 will be maintained in tension between the drive roll and the liner roll. Tension is maintained in the liner 97 between the drive roll and the stock roll because the stock roll shaft 225 is being driven clockwise while the liner is causing the stock roll 203 to be turned in a counterclockwise direction with the spring loaded slip clutch of the stock roll slipping (see FIG. 14). This is the direction the liner will take on the unloading side of the servicer in order to pay the stock wound on the stock drum onto the drum 47 of the tire building machine. When the ferris wheel is in the loading position as shown in FIG. 5, the liner will be driven from the liner roll to the stock roll to wind the stock S and the liner on the stock drum 203. In this loading condition, the liner roll 202 will be driven in a counterclockwise direction as viewed in FIG. 5, for example, and through the gearing 242, 243, the pulley 246 will be driven in a clockwise direction similarly to drive the drum 203 through the belt 248 with the clutch 247 engaged and clutch 236 slipping to maintain tension in the liner 97 between the liner roll and the drive roll. Tension in the liner 97 between the drive roll and the stock roll will be maintained because of the slightly larger diameter of the stock roll.

*The liner path*

The path of the liner from the liner drum 201 to the stock drum 203 extends from the liner drum about idler roll 250 which is positioned adjacent the liner drive roll 202 and such idler serves to hold the liner firmly against a substantial portion of the periphery of the liner drive roll 202. After the liner passes in the sinusoidal fashion indicated in FIG. 5 about the idler and the liner drive roll 202, it moves down to extend about the periphery of roller 251 journalled in arms 252 and 253. Such arms are secured to a pivot shaft 254 which is journalled in depending apical portions 255 and 256 of the side plates 190 and 191 respectively (note detail view of FIG. 12). The roll 251 is mounted on bushings 258 on shaft 259 and also mounted on such shaft adjacent the arms 252 and 253 respectively are crank arms 260 and 261. These arms are fixed to the shaft 259 and a clock spring 262 resiliently urges idler roll 263 journalled in the distal ends of such crank arms in a counterclockwise direction as viewed in FIG. 5. The idler roll 263 is thus urged upwardly between the idler 250 and a further idler 264 also journalled in arms 252 and 253. The liner 97 then passes from the liner drive roll 202 about the bottom of idler 251 and then up about the top of the spring loaded idler 263 and then down about the bottom of idler 264. Idler 263 thus serves to take up any excessive slack in the line 97 which occurs when the arms 252 and 253 move to and from the loading and unloading position. From the bottom of roll 264, the liner passes about idler roll 265 mounted on the distal end of the arms 252 and 253. From the roll 265, the liner then passes directly inclined upwardly to the stock drum 203.

The arm 252 includes a rearward extension 267 terminating in a bifurcated portion 268, the legs of which accommodate pivot shaft 269 therebetween. (Note also FIG. 11.) A roller 270 is mounted centrally between the legs of the bifurcated portion and straddling the roller 270 is a clevis 271 to which is secured a guide rod 272 which passes loosely through an opening 273 in the inside plate 191. Compression spring 274 surrounding such rod extending between washer 275 and the clevis 271 urges the arm extension 267 and thus the arms 252 and 253 as a unit in a counterclockwise direction about the axis of pivot shaft 254. The compression springs 274 for each of the storage drum units 197 through 200 serve to fold the arms 252 and 253 inwardly as indicated for the position of the arms for the storage units 197 through 199.

The storage unit in the lowermost position will have the arms 252 and 253 thereof urged radially outwardly or in a clockwise direction about the pivot shaft 254 against the pressure of spring 274 by cam members 280 on both the load and unload side of the servicer.

Figure 11:
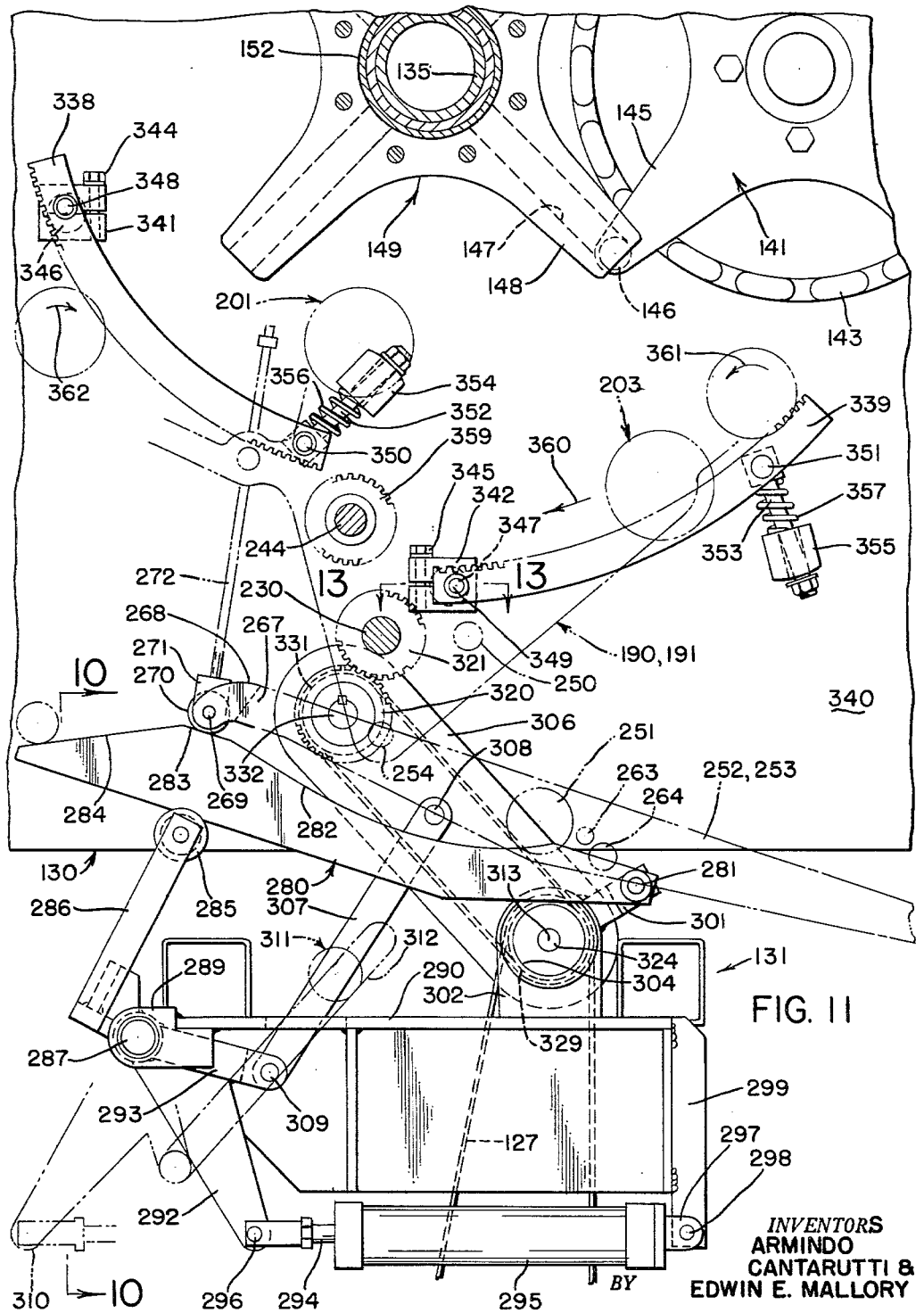
FIG. 11 is a fragmentary vertical section taken substantially on the line 11—11 of FIG. 9.

Referring now to FIGS. 10 and 11 as well as FIG. 9, it will be seen that the cam 280 is pivoted at 281 and includes a curved top cam surface 282, a relatively short substantially linear surface 283 and a distal linear outwardly inclined surface 284. Cam 280 is pivoted about the pivot 281 by means of a flanged support roller 285 mounted on the distal end of arm 286. The arm 286 is secured to a pivot shaft 287 which is supported for rotation in bosses 288 and 289 secured to the edge of shelf 290 of the base frame 131. The arm 286 is secured as by welding to a collar 291 which is keyed to the pivot shaft 287. Also secured to such collar is crank arm 292 and link 293 which may be welded together to pivot as a bell crank unit about the axis of shaft 287. Rod 294 of piston-cylinder assembly 295 is pin connected to such crank arm as indicated at 296 and the blind end of the cylinder 295 is provided with a clevis 297 which is connected by pin 298 to depending bracket 299. Oscillation of the arm 286 about the axis of pivot shaft 287 will then cause the cam 280 to pivot about the axis of pivot shaft 281.

The pivot shaft 281 is mounted in a bracket 301 which is welded or otherwise suitably secured to an upstanding boss 302 secured to the top of shelf 290. As shown in FIG. 9, the boss 302 is provided with an aperture having a bushing 303 therein which rotatably supports a hollow cylindrical member 304 having an enlarged inwardly projecting end 305 to which arm 306 is suitably secured. A link 307 pivotally connects the arm 306 as at 308 and the end of crank arm 293 as at 309. Extension of the rod 294 of the piston-cylinder assembly 295 to the phantom line position indicated at 310 in FIG. 11 will thus rock the arm 286 to move the flanged roller from the phantom line position 311 to the full line position and also move the link 307 from the phantom line position 312 to the full line position. The roller 285 will then pivot the cam 280 in a clockwise direction about the pivot 281 and the link 307 will pivot similarly the arm 306 in a clockwise direction about the pivot axis of cylindrical member 304 indicated at 313.

As the ferris wheel is indexed by the Geneva mechanism in a clockwise direction as viewed in FIG. 11, the roller 270 will engage the surface 282 of the cam 280 thus positioned causing the roller to ride up such surface to the linear portion 283 compressing spring 274. Accordingly, as the ferris wheel is indexed through 90° the arms 252 and 253 will pivot from the collapsed position indicated for the storage unit 197 to the extended position indicated for the storage unit 200 in the FIG. 5 position.

The movement of the arm 306 about the pivot axis 313 will also cause a driving engagement of gears 320 and 321 to afford a synchronized drive to the liner drive roll 202. The gear 321 is mounted inside the inner plate 191 on the shaft 230 of the liner drive roll 202.

On the loading side of the servicer, this drive will be afforded from the variable diameter pulley 123, the shaft of which is provided with cog belt pulley 125 driving belt 127. A pulley 323 is mounted on the end of stub shaft 324, one end of which is journalled in bearings 325 in shaft support member 326 secured to the top of shelf 290. The other end of the shaft is journalled in bearing 327 mounted in the enlarged end 305 of the sleeve 304. A cog-belt pulley 329 secured to the shaft 324 drives cog-belt 330 which is also trained about pulley 331 secured to shaft 332 which is journalled within sleeve member 333 suitably secured to the distal end of arm 306. Gear 320 is secured to the end of such shaft 332 thus to be driven by the belts 330 and 127. Circular contact plates 334 and 335 rotating with the respective gears 320 and 321 serve to ensure the proper contact pressure and avoid excessive gear wear as the two gears are brought into driving engagement. The pulleys 323, 329 and 331 may be identical in form and the size of the pulley 125 on the shaft of the variable diameter pulley 123 driving belt 127, being considerably larger, will drive the gears 320 and 321 at a substantially higher rate of speed, but since the liner drive roll is substantially smaller than the variable diameter pulley 123, the belt 14 will thus serve to drive the line 97 on the loading side of the servicer at the same synchronized speed. The diameter of the pulley 123 may be adjusted through the hand wheel 124 to ensure such synchronized belt and liner speeds.

It can now be seen that with the piston-cylinder assembly 295 retracted, both the cam 280 and the drive arm 306 will be elevated about the respective pivots 281 and 313 respectively to the full line position indicated in FIG. 11. In this position, the cam surface 282 will engage the roller 270 pivoting the arms 252, 253 in a clockwise direction extending the liner to the load position shown more clearly in FIG. 5. Also, the arm 306 will cause the driving engagement of the gears 320 and 321 to ensure the speed of the line 97 will be synchronized to the speed of the belt 14. The mechanism shown more clearly in FIG. 11 thus automatically forms the downwardly inclined liner apron to facilitate loading and unloading of the tire fabric and also in the case of the loading side, simultaneously engages a synchronized drive with the line.

*Liner payout and windup*

In order automatically to position the stock at the lower edge of the apron whereby it can be readily placed on drum 47 on the unload side to avoid manual tugging, etc., and to ensure that the stock will not hang loosely from the storage units as such are indexed about the horizontal axis of shaft 135, it becomes advantageous to pay the liner from the stock drum 203 when the arms are extended to form the apron and to rewind such liner onto the stock drum when the arms are retracted by the pressure of springs 274 when the rollers 270 ride down the linear inclined cam surface 284 as the ferris wheel is indexed in its clockwise direction viewed in FIG. 11. In order to accomplish this liner payout or windup as the ferris wheel is indexed and in response to such indexing thereof, there are provided two arcuate racks 338 and 339 mounted on the sides of columnar frame 130. With special reference to FIGS. 9, 11 and 13, it will be seen that each side of the frame 130 is provided with a face plate 340 having secured thereto anchor members 341 and 342 as by the screws 343 illustrated in FIG. 13. Such anchor members are split and provided with clamping bolts 344 and 345 respectively which firmly clamp eccentric adjustment members 346 and 347 therein. The respective arcuate racks are pin connected to such eccentrics by pins 348 and 349. The opposite ends of the circular racks are pin connected as at 350 and 351 to rods 352 and 353 extending through oversize openings in bosses 354 and 355 secured to the plate 340. Compression springs 356 and 357 surround the respective rods 352 and 353 which urge the respective racks 338 and 339 about the pivots 348 and 349 into driving engagement with gear 359. Gear 359 is secured to the end of shaft 244 projecting interiorly of the inside ferris wheel plate 191.

As the ferris wheel is indexed by the Geneva mechanism is the direction of the arrow 360 (FIG. 11) the gear 359 will engage the rack 339 and be rotated in the direction of the arrow indicated at 361. This rotates the shaft 244 in a counterclockwise direction and the pulley 246 on the opposite end thereof slips due to clutch 247, thus not driving belt 248. The drive roll 202 will be driven in the opposite direction by gears 243 and 242 and the belt 237 will be driven through engaged clutch 236 similarly driving the liner roll 201 to pull the liner from the stock roll 203. The driving engagement between the circular rack 339 and the gear 359 occurs while the roller 270 is riding up the cam surface 282 so that as the arms 252 and 253 are extended, the liner will be payed out from roll 203 accordingly.

After the stock drum has either been employed to pay the tire fabric wound thereon onto the tire building drum or has been loaded with strips of tire fabric from the conveyor 14, the servicer will again be indexed in the direction of the arrow 360 and the circular rack 338 will engage the gear 359 driving the gear in the direction indicated by the arrow 362 (FIG. 11). This will rotate the shaft 244 in a clockwise direction as seen in FIG. 11 to drive through engaged clutch 247 the pulleys 246 and 249 and the belt 248 trained thereabout, the stock drum 203 to take up the amount of liner required. This occurs as the arms 252 and 253 are pivoted to their folded position by the pressure of spring 274. The liner drive roll 202 will be driven in a counterclockwise direction as viewed in FIG. 11 by gears 242 and 243 to assist in pulling the liner from the liner roll 201. The clutch 236 will, of course, slip.

*Synchronized drives*

The mechanism for raising and lowering the cams 280 and the drive arms on the load and unload sides of the servicer will be substantially identical in form. However, on the unload side, two piston-cylinder assemblies indicated diagrammatically at 365 and 366 in FIG. 16 may be employed to pivot the arms 367 carrying the cam supporting roll 368 and the drive arm 369 respectively. In this manner, the operation of the piston-cylinder assemblies 365 and 366 may more readily be tied in to the cycle of operation of the drum type tire building machine 46.

We have seen how the adjustable diameter pulley 123 driven by the belt 14 serves automatically to synchronize the drive of the belt 14, which is, of course, synchronized with the belt 66, and the speed of the liner 97 so that the strip of material S dropping from the pan 80 onto the apron formed by the liner in the extended position of the arms 252 and 253 will be evenly wound in the stock drum 200 with no buckling and at zero tension.

From the unload side of the machine, a synchro-differential system may be employed to synchronize the drive of the drum and the liner so that the stock may be fed from the liner at the proper zero tension and without any buckling, etc. Referring now to FIG. 16, it will be seen that the tire building drum 47 is normally driven from drive motor 370 driving such drum through belt 371 trained about pulley 372 on the shaft 373 of such drum. However, during the unloading of the tire fabric, the drive of the drum 47 may be accomplished through a receiver motor 375 driving a reducer 376 by means of a belt transmission 377. The reducer drives a pulley 378 through an electromagnetic clutch 379 and the pulley 378 drives a belt 380 trained about pulley 381 also driving the pulley 382 driving belt 371.

The receiver motor 375 is connected to a differential motor 383 which is similarly connected to a transmitter motor 384. The differential motor is driven by a 30:1 speed reducer 385 which is in turn driven by a magnetic clutch 386. The pulleys 387 and 388 on the differential motor 383 and speed reducer 385 produce a 5:1 ratio. The reducer itself, however, may produce a 30:1 ratio. The clutch 386 may preferably be connected to the shaft 389 of the transmitter motor 384 by the bevel gears 390, shaft 391 and the 2:1 gear train 392. The shaft of the transmitter motor is connected by coupling 393 to a 2 H.P. 1750 r.p.m. motor 394 which also drives a gear head motor 395 with a 78 r.p.m. output. This output drives pulley 396 driving belt 397 which in turn drives pulley 398. Pulleys 399 and 400 on the drive arm 369 have belt 401 trained thereabout to drive gear 402 which meshes with gears 321 of the liner drive roll 202 on the unload side. Engagement of the drive between gear 402 and gear 321 is, of course, controlled by the piston-cylinder assembly 366 which is in turn controlled by the cycle of the tire building machine. The mechanical drive linkage provided by the shaft 391 and the associated gears ensures that the set speed ratios of the transmitter motor 384 and the clutch 386 driving the differential motor 383 will be maintained. The motors or generators 383 and 384 and the motor 375 are sometimes commonly referred to as "Selsyns."

The receiver motor 375 drives the speed reducer 376 which has a 20:1 ratio and this then drives the drum 47 through the magnetic clutch 379 which is normally disengaged and will be engaged only when the servicer is applying the fabric to the drum 47.

It can now be seen that the belt 14 and liner are driven from a common power source, namely the motor 23 at the loading side of the servicer and that the liner 97 and the drum 47 are driven from the same power source at the unloading side of the servicer, namely the motor 394. Thus such motor may, for example, drive the liner drive roll 202 at 78 r.p.m. and through the synchro-differential Selsyn system shown, rotate the drum 47 at 19.55 r.p.m. The drum 47 may be approximately 14 to 17 inches in diameter as opposed to the 4¾ inches diameter of the liner drive roll 202. As the effective drum diameter increases due to layers of material being applied thereto, the synchro-drive may be adjusted accordingly.

*Operation*

A coil of tire fabric will be positioned on the uncoiling stand 2 to have the fabric fed in the direction of the arrow 4 onto the high table bias cutter provided with a plurality of variable length conveyor belts 5. When the tire fabric is thus uncoiled, the cords therein will be extending in the direction of such arrow 4 and rhomboid sections will be severed by the reciprocating bias cutter 6 running back and forth on the track 7, which may be adjusted to obtain the desired angle of bias and the width of severed section. The severed sections 10 drop down the inclined slide onto the table top 12 against the aligning guide bar 11 to be joined either automatically or manually into elongated strips of tire fabric. Then, depending upon the direction of bias desired, the strips will be fed either directly onto the belt 14 or onto the belt 15 to be inverted onto the belt 14 so that the angle of bias will be in a direction opposite to that which it would normally be if fed directly onto the belt 14.

Through carefully predetermined scheduling, the strip of tire fabric may then be fed selectively to any one of a plurality of servicing machines in the conveyor line. This may be done by elevating the loading and centering conveyor 62 for the selected servicer while maintaining the remaining loading and centering conveyors in their down or by-pass positions. Not only may the servicer be preselected to be fed, but the particular storage drum of each of the servicers may be also preselected and the desired ferris wheel may be indexed into position over the conveyor belt 14 by rotation of the selected unit about the vertically extending turret axis. The selected drum is then obtained by indexing the ferris wheel about its horizontal axis by the drive motors 139 or 140 driving the Geneva movement mechanisms.

As the selected drum, for example, drum 203, is indexed into position by the Geneva mechanism rotating the ferris wheel in a clockwise direction as viewed in FIGS. 5, 11 and 17, for example, the gear 359 will engage the arcuate rack 339 rotating such gear in a counterclockwise direction similarly rotating the gear 243 and oppositely rotating gear 242 on the shaft of the liner drive roll 202. The liner drive roll is thus driven to wind the liner on the liner drum from the stock drum and the overrunning clutch 236 will be engaged to drive the liner drum through the belt 237 pulling a selected length of the liner from the stock drum 203. The length of the arcuate rack 339 is selected so that sufficient liner will be payed from the stock drum so that on the unload side the tire fabric will hang over the roll 265 and onto drum 47 to be easily placed thereon.

The overrunning clutch 236 will be engaged when winding the liner 97 onto the roll 201 from the stock roll 203. In this manner, the stock roll or drum 203 will be driven by belt 97 slipping on its shaft 225 which is driven in the opposite direction by cog belt 237, the belt 97 being driven by the liner drive roll 202 and the liner roll 201. At this time, the roller-cam clutch 247 on the shaft 244 will slip. Simultaneously, the extension of the piston-cylinder assembly 295 will raise the cam 280 about the pivot 281 and the drive arm 306 about the pivot axis 313 by the linkage shown more clearly in FIG. 11 to cause engagement of the gears 320 and 321. On the loading side, the variable diameter drum 123 will drive the belt 127 in turn driving the belt 330 by means of gears 323 and 329 which will drive the gear 320 driving the liner drive roll to pull the liner 97 from the liner roll 201 and the belt 248 trained about pulleys 246 and 249 will then drive the stock roll 203 through the now engaged roller cam clutch 247 mounted on shaft 244 which is turned by the engagement of gears 242 and 243. The tire fabric will ride up the loading and centering conveyor to drop over the roller 64 adjacent the edge position responsive control unit 95 onto the inclined pan 80 and then onto the apron formed by the extension of the arms 252 and 253. Such arms are extended, of course, by the roller 270 riding up the cam surface 282 to pivot the arms about the pivot 254.

When the proper length of stock has been wound into the drum 203 about contiguous layers of liners 97, the ferris wheel will again be indexed by the Geneva mechanism and such further indexing causes the driving engagement of gear 359 with the arcuate rack 338. This drives the shaft 244 in a clockwise direction as viewed in FIG. 11 which drives the liner drive roll 202 in a counterclockwise direction pulling the liner from the drum 201 and the clutch 247 which will be engaged drives the belt 248 to drive the portion 249 of the pulley on the stock roll shaft 203 to turn the stock roll in a clockwise direction winding the liner onto the stock roll. This ensures that any excess fabric laying upon the apron will be wound into the storage unit 200 as it is indexed in a clockwise direction by movement of the ferris wheel. This avoids any loose material hanging from the unit. The roller 270 riding down the cam surface 284 will permit the pressure of spring 274 to pivot the arms 252, 253 about the axis 254 moving such arms to their folded position as seen at the unit 197 in FIG. 5.

When the selected ferris wheel of the selected servicer is in this manner loaded by positioning the successive storage units 197 through 200 at the loading pan 80 of the servicer loading and centering conveyor, the servicer will be rotated about its central vertically extending axis by the drive shown more clearly in FIGS. 6 through 8. Energization of the motor 74 will rotate the pinion 170 which, during the initial linear portion of the slot and rack 169, will be ineffective to rotate the servicer about the axis of gear 198. As the pinion moves into the arcuate portion of the slot, the engagement of the gear segment 159 with the gear 158 will start to rotate the servicer about its central axis and the maximum speed of rotation will be reached in the position shown more clearly in FIG. 7. Continued rotation of the unit continues at a decelerating speed until the pinion 70 moves back to its original position as governed by the ways 177 and 178 until it is within the opposite linear end portion of the slot 167 and engaging the corresponding linear portion of the rack 169. In this manner, the ferris wheel 136 will move to the position formerly occupied by ferris wheel 137 in FIG. 4 and vice versa.

Now, the operation of the machine 46 driving the drum type tire building unit 47 may automatically be controlled and within the cycle of such machine the operation of piston-cylinder assemblies 365 and 366 may also be controlled. The synchronization of the liner drive roll 202 and the drum 47 is obtained by means of the selsyns 375, 383 and 384 so that, in effect, both the drum 47 and the roll 202 are driven by the motor 394 at the proper selected synchronized speed. The same procedure as when loading occurs in that the gear 359 will engage the arcuate rack corresponding to the rack 339 when the selected drum is indexed into the unloading position. Also with the extension of piston-cylinder assembly 365, the cam 280 on the unloading side will be pivoted to its operative position to engage the roller 270 to pivot the arms 252 and 253 downwardly to form the unloading apron wherein the idler roll 265 will be positioned adjacent the top periphery of the drum 47. While this occurs, the gear 359 rotates the drive roll 202 to pay the liner from the stock roll onto the liner roll a sufficient distance to move the leading edge of the convoluted tire fabric or stock over the idler roll 265 from where it can conveniently be placed on the periphery of the drum 47 without tugging or stretching. The cycle of the drum type tire building machine may then extend piston-cylinder assembly 366 to provide the drive for the liner roll 202 from the motor 394 and the magnetic clutch 379 will be engaged so that the drum 47 will also be driven thereby at the synchronized speed determined by the selsyns 375, 383 and 384. After the correct amount of fabric has been placed upon the drum, the cycle of the machine will extend the piston-cylinder assembly 366 to disengage the drive between gears 402 and 321 and the ferris wheel may then be indexed by its Geneva mechanism drive 139 to position the next storage unit at the loading position and when this occurs, the arcuate gear corresponding to gear 388 will drive the gear 359 again to wrap any loose or hanging portion of the fabric into the unit 200 as it moves about the ferris wheel axis. When the next unit 197 is indexed into position, the same procedure will occur and in this manner the tire fabric in the unit 197 which may have its cords biased in the opposite direction will be placed in position to have the fabric therein fed directly onto the drum 47. It will be understood that the fabric will be fed onto the drum in addition to a liner, for tubeless tires, chafer and breaker strips and tread stock, which is normally fed to the drum from a separate source. Tread stock, for example, may be fed to the drum 47 on the conveyor mechanism shown generally at 425 in FIG. 2 which is positioned beneath the ferris wheel 137 in such figure.

It can now be seen that there is provided a servicing mechanism for drum type tire building machines wherein the strips of tire fabric or other materials can quickly be formed by the bias cutter and such strips can then be fed selectively to the desired storage drums of the servicers and the centering and loading conveyors will ensure that the strips are properly centered in the liner and drum mechanisms of each ferris wheel. It is then possible with predetermined programming or scheduling to more or less continuously feed the various servicers in the conveyor system and in this manner a more efficient operation of the corresponding drum type tire building machines will be obtained. Moreover, the uniformity in the storing of the fabric guarantees the uniformity in the paying out of such fabric onto the drums and, of course enhances the uniformity of the built tire. In this manner, tires of greater uniformity and quality may be built at higher speed. Moreover, with the servicer of the present invention, it is possible to incorporate the controls for such servicer into the cycle of the tire building machine so that the operator need not be called upon to handle manually the tire fabric and need not tug or pull such fabric from the storage drums. Since the tire fabric is of such flimsy nature, it is hard to pull on it without distorting it or stretching it unduly and such handling problems that occur make it extremely difficult to feed uniformly onto the drum without stretching or buckling which again results in tires of nonuniform construction. With the present invention, such manual handling is eliminated and tires of greater uniformity are thus obtained.

Other modes of applying the principle of the invention may be employed, change being made as regards the details described, provided the features stated in any of the following claims or the equivalent of such be employed.

We, therefore, particularly point out and distinctly claim as our invention:

1. A servicer for a drum type tire building machine comprising a liner, a liner storage drum, a liner drive roll drivingly engaging said liner, a liner and tire fabric storage drum, and means operative to drive said liner drive roll and thus said liner to wrap uniformly such tire fabric between contiguous layer of liner on said liner and tire fabric storage drum.

2. The servicer set forth in claim 1 including drive means interconnecting said liner drive roll, said liner storage drum, and said liner and tire fabric storage drum whereby rotation of said liner drive roll in either direction will maintain said liner at uniform tension throughout.

3. A servicer for drum type tire building machines comprising oppositely extending ferris wheels, each said ferris wheel comprising a plurality of tire fabric storage units, each said storage unit including a liner adapted to wrap contiguous convolutions of tire fabric material on a fabric storage drum, and means to extend the path of said liner to provide a fabric loading and unloading apron.

4. A servicer as set forth in claim 3 including means automatically to extend the path of said liner when the selected storage unit is indexed in position to receive or unload such tire fabric.

5. The servicer set forth in claim 3 including a loading mechanism for said servicer, and synchronized drive means driving the liner of the selected storage unit in synchronism with said loading mechanism and in synchronism with the drum of the tire building machine.

6. The servicer as set forth in claim 3 including means operative to pay out said liner from said fabric storage drum as the path of said liner is extended to provide the fabric loading and unloading apron.

7. The servicer as set forth in claim 3 including automatic loading means therefor, and means to synchronize the drive of said liner with the drive of said loading means as the path of said liner is extended to provide the fabric loading and unloading apron.

8. The servicer as set forth in claim 3 including means operative to drive said drum of the tire building machine at the synchronized speed of the liner when the path of the liner is extended to provide a fabric unloading apron.

9. A tire servicer comprising a liner, a liner roll, drive roll, and stock roll, an idler roll movable relatively to said liner, drive and stock rolls about which such liner is wrapped, and means operative to move said idler roll to form an inclined loading and unloading apron between said idler roll and stock roll.

10. A servicer as set forth in claim 9 including drive means for said drive roll operative to drive said liner from said liner roll to said stock roll around said idler roll up the inclined path of the apron to wrap contiguous layers of liner and tire fabric around said stock roll.

11. The tire servicer set forth in claim 9 including drive means for said drive roll operative to drive said liner from said stock roll to said liner roll to pay fabric from said stock roll down the inclined path of said liner from said stock roll to said idler roll whereby such fabric may be payed onto the drum of a drum-type tire building machine.

12. The servicer as set forth in claim 9 wherein said drive roll is of slightly smaller diameter than said liner and stock rolls, and belt drive means interconnecting said drive roll with said liner and stock rolls operative to drive alternately the liner and stock rolls as the drive roll is rotated in opposite directions.

13. The combination of a drum-type tire building machine and a tire servicer, said tire servicer comprising a plurality of tire fabric storage units, each having a liner, and means operative to index a selected tire fabric storage unit into position to feed tire fabric to the drum of said drum-type tire building machine, drive means for said liners, and means operative to connect the drive means of the liner of the selected tire fabric storage unit to said drum whereby said liner and said drum will be driven at synchronized speeds whereby tire fabric may be payed from said liner to said drum uniformly at controlled tension.

14. A servicer for a drum-type tire building machine comprising a plurality of tire fabric storage units, each storage unit comprising a fabric storage drum adapted to store contiguous layers of tire fabric material wrapped about a protective liner, and means operative to extend and retract the liner of the selected storage unit to form a loading or unloading apron for such tire fabric.

15. A servicer as set forth in claim 14 including drive means for said liner, and means operative to synchronize the drive of said liner with the drive of the drum of the drum-type tire building machine when the tire fabric is being payed from the storage drum whereby such tire fabric will be applied to the drum at controlled tension.

16. A servicer for a drum-type tire building machine comprising a plurality of tire fabric storage units, means operative to index the selected tire fabric storage unit to a position to pay tire fabric stored therein to the drum of such drum-type tire building machine, and means to bridge such drum and storage unit whereby such tire fabric may be payed substantially directly onto the drum of such drum-type tire building machine, and means to synchronize the drive of said drum and the fabric storage unit to pay the fabric therefrom at controlled tension.

17. In a tire servicer for a drum-type tire building machine, a storage unit for tire building materials, means operative to move said storage unit into a tire building material dispensing position, and means responsive to such movement operative to extend such material from said unit for convenient application to such drum; said storage unit including a tire building material storage drum, a liner for said drum, and means responsive to such movement operative to extend the path of said liner substantially to bridge said storage drum and such building drum.

18. A tire servicer as set forth in claim 17 wherein said liner is mounted to extend about a roller, said roller being mounted at the distal end of a pair of arms, and cam means operative in response to such movement to swing said arms and thus said liner to such extended position.

19. A tire servicer as set forth in claim 18 including dispensing drive means for said liner operative only in said dispensing position, and synchronizing means connected to said drive means operative to drive such building drum at substantially the same surface speed as said liner whereby such tire building material may be dispensed onto such building drum at controlled tension.

20. A tire servicer as set forth in claim 19 wherein said storage unit includes a liner storage drum and a liner drive roll, said drive means being operative to drive said liner storage drum and said liner drive roll to pull said liner from said building material storage drum and around said roller to deposit such material on such building drum.

21. A tire servicer as set forth in claim 20 wherein said means operative to extend such material comprises storage unit movement responsive drive means for said liner storage drum and said liner drive roll.

22. In a tire servicer for a drum-type tire building machine, a storage unit for tire building materials, means operative to move said storage unit into a tire building materials loading position, power driven loading means operative to load tire building materials into said storage unit, and means responsive to movement of said unit away from said loading position to retract such material into said unit; said storage unit including a tire building materials storage drum, a liner for said drum, and means responsive to such movement of said storage unit to loading position operative to extend said liner substantially to bridge said storage drum and such loading means.

23. A tire servicer as set forth in claim 22 wherein said liner is mounted to extend about a roller mounted at the distal end of a pair of arms, and cam means operative in response to such movement to loading position to swing said arms and thus said liner to an extended position.

24. A tire servicer as set forth in claim 23 including drive means for said liner operative in said loading position, said drive means synchronizing the drive of said liner with the drive of said loading means whereby said liner will be driven at substantially the same surface speed as said loading means so that tire building materials may be loaded into said storage unit at substantially zero tension.

25. A tire servicer as set forth in claim 24 wherein said storage unit includes a liner storage drum and a liner drive roll, said drive means being operative to drive said building materials storage drum and said liner drive roll to pull said liner from said liner storage drum around said roller to wrap such materials about contiguous layers of liner on said building materials storage drum.

26. A tire servicer as set forth in claim 25 wherein said means operative to retract such material comprises storage unit movement responsive drive means for said building materials storage drum and said liner drive roll.

27. A servicer for a drum type tire building machine comprising a liner, a liner storage drum, a liner drive roll drivingly engaging said liner, a liner and tire fabric storage drum, means operative to drive said liner drive roll, liner storage drum, and liner and tire fabric storage drum to wrap uniformly such tire fabric between contiguous layers of liner on said liner and tire fabric storage drum, a pair of pivotally mounted arms, an idler roll at the distal end of said arms, said liner being trained about said idler roll passing directly onto said liner and tire fabric storage drum, and means to pivot such arms from a folded position to an extended position wherein said idler roll is adjacent the periphery of the drum of such drum type tire building machine, said liner in the extended position of said arms forming an unloading and loading apron for the liner and tire fabric storage drum.

28. A servicer for drum type tire building machines comprising oppositely extending ferris wheels, each said ferris wheel comprising a plurality of tire fabric storage units, each said storage unit including a liner adapted to wrap contiguous convolutions of tire fabric material on a fabric storage drum, means to extend the path of said liner to provide a fabric loading and unloading apron, and drive means to index said ferris wheels about a vertically extending axis to position said ferris wheels alternately at loading and unloading positions, said drive means including means automatically to accelerate and decelerate the rotational movement of said servicer about such vertically extending axis.

29. A tire servicer comprising a liner, a liner roll, drive roll, and stock roll, an idler roll movable relatively to said liner, drive and stock rolls about which such liner is wrapped, means operative to move said idler roll to form an inclined loading and unloading apron between said idler roll and stock roll, said idler roll being mounted on a pair of pivoted arms, and means operative to pivot said arms to the apron-forming position of said idler roll as the stock roll is positioned to load or unload tire fabric.

30. A tire servicer comprising a base, a turret column mounted on said base for horizontal swinging movement about a centrally disposed vertical axis, oppositely extending ferris wheels mounted on said turret column on a horizontally extending axis, each ferris wheel including a plurality of tire fabric storage and dispensing units, means operative to oscillate said turret column and thus said ferris wheels through an arc of 180°, and drive means on said turret column operative intermittently to rotate said ferris wheels about said horizontally extending axis to position a selected tire fabric storage and dispensing unit in a loading or unloading position on opposite sides of said servicer, respectively; said drive means operative to oscillate said turret column through the arc of 180° comprising a driven gear on said turret column, a gear segment in mesh with said driven gear, and means operative to oscillate said gear segment through an arc of 90° to oscillate said turret column through an arc of 180°, said last mentioned means comprising a reciprocating drive having a pinion in mesh with an arcuate rack mounted on said gear segment, said pinion being confined within an arcuate slot adjacent said rack and operative to oscillate said gear segment through an arc of 90° as said drive means is reciprocated a complete stroke.

31. A tire servicer comprising a base, a turret column mounted on said base for horizontal swinging movement about a centrally disposed vertical axis, oppositely extending ferris wheels mounted on said turret column on a horizontally extending axis, each ferris wheel including a plurality of tire fabric storage and dispensing units, means operative to oscillate said turret column and thus said Ferris wheels through an arc of 180°, and drive means on said turret column operative intermittently to rotate said Ferris wheels about said horizontally extending axis to position a selected tire fabric storage and dispensing unit in a loading or unloading position on opposite sides of said servicer, respectively; said drive means operative to oscillate said turret column through the arm of 180° comprising a driven gear on said turret column, a gear segment in mesh with said driven gear, and means operative to oscillate said gear segment through an arc of 90° to oscillate said turret column through an arc of 180°, said last mentioned means comprising a reciprocating drive having a pinion in mesh with an arcuate rack mounted on said gear segment, said pinion being confined within an arcuate slot adjacent sad rack and operative to oscillate said gear segment through an arc of 90° as said drive means is reciprocated a complete stroke, said means operative intermittently to rotate each said ferris wheel about the horizontal axis comprising a Geneva drive mechanism mounted on top of said turret column.

32. A tire servicer comprising a base, a turret column mounted on said base for horizontal swinging movement about a centrally disposed vertical axis, oppositely extending ferris wheels mounted on said turret column on a horizontally extending axis, each ferris wheel including a plurality of tire fabric storage and dispensing units, means operative to oscillate said turret column and thus said ferris wheels through an arc of 180°, and drive means on said turret column operative intermittently to rotate said ferris wheels about said horizontally extending axis to position a selected tire fabric storage and dispensing unit in a loading or unloading position on opposite sides of said servicer, respectively; said drive means operative to oscillate said turret column through the arc of 180° comprising a driven gear on said turret column, a gear segment in mesh with said driven gear, and means operative to oscillate said gear segment through an arc of 90° to oscillate said turret column through an arc of 180°, said last mentioned means comprising a reciprocating drive having a pinion in mesh with an arcuate rack mounted on said gear segment, said pinion being confined within an arcuate slot adjacent said rack and operative to oscillate said gear segment through an arc of 90° as said drive means is reciprocated a complete stroke, said means operative intermittently to rotate each ferris wheel about the horizontal axis comprising a Geneva wheel drive mechanism mounted on top of said turret column; said Geneva drive mechanism comprising a driven radially slotted star wheel mounted on said horizontal axis, a drive star wheel having rollers adapted to engage within such radial slots of said driven star wheel, and drive means for said drive star wheels adapted to drive said drive star wheels through increments of 90°.

33. In a tire servicer for a drum type tire building machine, a storage unit for tire building materials, means operative to move said storage unit into a tire building material dispensing position, means responsive to such movement operative to extend such material from said unit for convenient application to such drum, said storage unit including a tire building material storage drum, a liner for said drum, means responsive to such movement operative to extend said liner substantially to bridge said storage drum and such building drum, said liner being mounted to extend about a roller, said roller being mounted at the distal end of a pair of arms, cam means operative in response to such movement to swing said arms and thus said liner to such extended position, dispensing drive means for said liner operative only in said dispensing position, and synchronizing means connected to said drive means operative to drive such building drum at substantially the same surface speed as said liner whereby such tire building material may be dispensed onto such building drum at controlled tension; said storage unit including a liner storage drum and a liner drive roll, said drive means being operative to drive said liner storage drum and said liner drive roll to pull said liner from said building material storage drum and around said roller to deposit such material on such building drum, said means operative to extend such material comprising storage unit movement responsive drive means for said liner storage drum and said liner drive roll, said storage unit responsive drive means comprising a pinion on said storage unit, and a spring loaded rack operative to engage said pinion as said storage unit is moved therepast.

34. In a tire servicer for a drum type tire building machine, a storage unit for tire building materials, means operative to move said storage unit into a tire building materials loading position, power driven loading means operative to load tire building materials into said storage unit, means responsive to movement of said unit away from said loading position to retract such material into said unit, said storage unit including a tire building materials storage drum, a liner for said drum, means responsive to such movement of said storage unit to loading position operative to extend said liner substantially to bridge said storage drum and such loading means, said liner being mounted to extend about a roller mounted at the distal end of a pair of arms, and cam means operative in response to such movement to loading position to swing said arms and thus said liner to an extended position, drive means for said liner operative in said loading position, said drive means synchronizing the drive of said liner with the drive of said loading means whereby said liner will be driven at substantially the same surface speed as said loading means so that tire building materials may be loaded into said storage unit at substantially zero tension, said storage unit including a liner storage drum and a liner drive roll, said drive means being operative to drive said building materials storage drum and said liner drive roll to pull said liner from said liner storage drum around said roller to wrap such materials about contiguous layers of liner on said building materials storage drum; said means operative to retract such material comprising storage unit movement responsive drive means for said building materials storage drum and said liner drive roll, said storage unit responsive drive means comprising a pinion on said storage unit, and a spring loaded rack operative to engage said pinion as said storage unit is moved therepast.

35. In a tire servicer for a drum type tire building machine, a storage unit for tire building materials, means operative to move said storage unit into a tire building materials loading position, power driven loading means operative to load tire building materials into said storage unit, and means responsive to movement of said unit away from said loading position to retract such material into said unit, said means operative to retract such material comprising a pinion on said storage unit and a rack operative to engage said pinion as said storage unit is moved therepast.

36. A storage facility for tire building materials comprising a liner storage drum, a liner and tire building material storage drum, a liner threaded on said drums and extending therebetween, means alternatively to drive said liner in opposite directions, means to drive the drum onto which said liner is payed, and means to retard rotation of the drum from which said liner is payed.

37. A storage facility for tire building materials comprising a liner storage drum, a liner and tire material storage drum, a liner threaded on said drums and extending therebetween, a liner drive roll in engagement with said liner, means to drive said liner drive roll and thus said liner in opposite directions, and means to maintain tension in said liner between said drive roll and said drums regardless of the direction of movement of said liner.

38. A storage facility as set forth in claim 37 including drive means interconnecting said drums and liner drive roll to rotate the drum onto which the liner is being payed to take up slack therein, said drums being slightly larger in diameter than said liner drive roll, and slip clutch means in said drive means to limit the speed of the drum onto which the liner is being payed to the speed of the liner.

39. A storage facility as set forth in claim 38 wherein the drum onto which the liner is payed is driven in one direction of liner travel directly from said liner drive roll and in the opposite direction of liner travel from a counter shaft extending parallel thereto.

40. A storage facility as set forth in claim 39 including endless drive means interconnecting the liner drive roll and one of said drums, and said counter shaft and the other of said drums, respectively.

41. A storage facility as set forth in claim 40 including an endless belt drive connecting the counter shaft and storage drum, and a further endless belt drive connecting the liner drive roll and the liner storage drum.

42. A storage facility for tire building materials comprising a liner roll, a liner and tire building materials storage roll, a liner threaded on said rolls and extending therebetween, a liner drive roll in direct engagement with said liner, and means to drive said liner drive roll and thus said liner in opposite directions whereby such tire building materials may be wound on or payed from said storage roll.

43. A materials storage facility comprising a liner roll and a storage roll, a liner threaded on and extending between said rolls, drive means in direct engagement with said liner operative to drive the same in opposite directions, means operative to turn said rolls in opposite directions depending on the direction of movement of said liner, and slippage means between said last mentioned means and said rolls to maintain a continuous turning force to exert tension on said liner.

44. A materials storage facility comprising first and second rolls, a liner threaded on and extending between said rolls, turning means operative to drive said rolls in opposing directions thereby to exert tension on said liner, slippage means between said turning means and the respective rolls operative to exert a continuous turning force on said rolls regardless of the direction of movement thereof, and drive means in direct engagement with said liner operative to drive the same in opposite directions.

45. A materials storage facility comprising first and second rolls, a web threaded on and extending between said rolls, turning means operative to drive said rolls in opposing directions thereby to exert tension on said web, slippage means between said turning means and the respective rolls operative to exert a continuous turning force on said rolls regardless of the direction of movement thereof, and drive means in direct engagement with said web operative to drive the same in opposite directions.

References Cited by the Examiner
UNITED STATES PATENTS

| | | | |
|---|---|---|---|
| 1,123,172 | 12/1914 | Compton | 74—32 |
| 1,199,296 | 9/1916 | Murray | 74—32 |
| 1,717,706 | 6/1929 | Harris | 74—32 |
| 2,231,853 | 2/1941 | MacDonald et al. | 156—406 |
| 2,253,781 | 8/1941 | Haase et al. | 156—406 |
| 2,521,728 | 9/1950 | Kastner | 156—406 |
| 2,558,903 | 7/1951 | Kastner | 156—406 |
| 2,605,196 | 7/1952 | Bostwick | 156—395 |
| 2,625,198 | 1/1953 | Bostwick | 156—406 |
| 2,918,105 | 12/1959 | Harris | 156—395 |
| 3,014,831 | 12/1961 | Nebout | 156—406 |
| 3,019,153 | 1/1962 | Noall et al | 156—406 |
| 3,081,959 | 3/1963 | Goodwin | 156—405 |

ALEXANDER WYMAN, *Primary Examiner.*

HAROLD ANSHER, *Examiner.*